United States Patent [19]
Itoyama

[11] Patent Number: 6,026,790
[45] Date of Patent: *Feb. 22, 2000

[54] DIESEL ENGINE EMISSION CONTROL SYSTEM

[75] Inventor: Hiroyuki Itoyama, Yokohama, Japan

[73] Assignee: Nissan Motor Co., Ltd., Yokohama, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/970,805

[22] Filed: Nov. 14, 1997

[51] Int. Cl.$^7$ .................................................. F02M 25/07
[52] U.S. Cl. .................... 123/568.16; 123/505; 123/378; 123/568.22; 123/568.28
[58] Field of Search ...................................... 123/378, 445, 123/446, 505, 568.16, 568.21, 568.22, 568.25, 568.27, 568.28, 568.29, 568.3

[56] References Cited

U.S. PATENT DOCUMENTS

| | | | |
|---|---|---|---|
| 4,171,691 | 10/1979 | Nohira et al. | 123/568.22 |
| 4,304,209 | 12/1981 | Straubel | 123/568.27 |
| 4,387,694 | 6/1983 | Yoshiba et al. | 123/378 |
| 4,388,912 | 6/1983 | Kimura et al. | 123/568.27 |
| 4,428,354 | 1/1984 | Sundeen et al. | 123/568.28 |
| 4,428,355 | 1/1984 | Yokooku | 123/568.16 |
| 4,433,666 | 2/1984 | Masaki et al. | 123/568.22 |
| 4,466,416 | 8/1984 | Kawamura | 123/378 |
| 4,479,473 | 10/1984 | Wade | 123/369 |
| 4,602,606 | 7/1986 | Kawagoe et al. | 123/568.22 |
| 4,625,702 | 12/1986 | Onishi | 123/568.28 |
| 4,762,109 | 8/1988 | Jeeicke | 123/568.21 |
| 4,794,903 | 1/1989 | Suzuki | 123/698 |
| 5,152,273 | 10/1992 | Ohuchi | 123/568.16 |
| 5,377,651 | 1/1995 | Sczomak et al. | 123/568.28 |
| 5,524,591 | 6/1996 | Hirota et al. | 123/568.21 |
| 5,540,091 | 7/1996 | Nakagawa | 123/568.16 |
| 5,664,548 | 9/1997 | Izutani et al. | 123/568.16 |
| 5,704,340 | 1/1998 | Togai | 123/568.28 |

FOREIGN PATENT DOCUMENTS

| | | |
|---|---|---|
| 37 03 091 | 2/1990 | Germany . |
| 41 35 190 | 4/1994 | Germany . |
| 197 50 389 | 7/1998 | Germany . |
| 4-116654 | 10/1992 | Japan . |
| 2 083 657 | 3/1982 | United Kingdom . |
| 2 090 329 | 7/1982 | United Kingdom . |
| 2 313 927 | 12/1997 | United Kingdom . |

OTHER PUBLICATIONS

"Nissan Terrano" Manual (R50–0), pp. 70–89, Jul. 1995.

Primary Examiner—Willis R. Wolfe
Attorney, Agent, or Firm—Foley & Lardner

[57] ABSTRACT

The present invention provides improvements in EGR control system of a diesel engine by limiting the maximum fuel, in amount, to be drawn into the engine cylinder and EGR rate in response to result of monitoring performance of EGR control. When the actual performance of EGR control falls outside of a predetermined window around the normal performance of EGR control, the maximum fuel is reduced and a throttle valve in the air intake path is fully opened.

11 Claims, 20 Drawing Sheets

DIESEL ENGINE EMISSION CONTROL SYSTEM

FIELD OF THE INVENTION

The present invention relates to a system for controlling emissions from a diesel engine by both recirculating engine exhaust gases and modulating the fuel injection amount.

BACKGROUND OF THE INVENTION

Recirculation of a controlled amount of diesel engine exhaust gas to the engine air intake is generally known to provide a beneficial reduction in diesel engine emissions of oxides of nitrogen NOx. Limits are conventionally imposed on the amount of recirculated exhaust gas EGR to avoid excessive engine intake air charge dilution that may degrade engine performance and increase particulate emission levels. An adequate amount of excess air must be maintained for a smoke-free combustion by imposing limits on the amount of fuel injection.

Both open-loop and closed-loop EGR control operate to deliver EGR to the engine air intake in an amount reflecting a compromise between the competing goals of minimizing NOx and particulate emissions in an engine that deliver a satisfying level of performance. The open-loop approaches deliver EGR according to an open-loop EGR schedule determined through a modeled or calibrated relationship between desired EGR and certain EGR parameters. Such open-loop approaches are sensitive to variations in that modeled or calibrated relationship, such as may result from sensor or actuator degradation over time.

Closed-loop approaches attempt to compensate for system disturbances by including some measure of the actual performance of the EGR control in the determination of a desired EGR amount. Since recirculated exhaust gases displace intake air that would otherwise be drawn into the cylinders of the diesel engine, a sensed engine mass airflow (MAF) is decreased with increasing levels of the exhaust gas recirculation. Thus, a closed-loop EGR control is known, which is responsive to the MAF. MAF is currently a sensed parameter on many conventional engine control systems. MAF is commonly generated through a sensor in the intake air path to the engine at a point after an air filter has filtered the intake air has been filtered by an air filter. Accordingly the MAF sensor is exposed to a minimal level of contaminants. Further, the MAF sensor is commonly spaced a considerable distance away from high temperature components, reducing potential sensor wear due to temperature.

Generally, the greater the amount of exhaust gases recirculated the lower the emission levels of oxides of nitrogen NOx. However, the air-to-fuel ratio of the mixture in the cylinders is decreased with increasing levels of exhaust gas recirculation. Therefore, in order to prevent undesirable smoke emissions, the amount of exhaust gases recirculated must be limited to levels that do not result in excessively rich air-to-fuel ratios that produce smoke emissions.

For preventing undesirable smoke emissions, the amount of fuel to be drawn into the cylinder during engine cycle must be lower than the upper maximum fuel that is limited in accordance with the actual performance of EGR control.

An EGR valve of the EGR control system is subject to the harsh environment of the EGR path, so that operation loss resulting from valve contamination and valve exposure to temperature may occur.

Accordingly, it would be desirable to take into account occurrence of operation loss of an EGR control valve that is subject to the harsh environment of the EGR path in determining the maximum fuel and desired EGR.

SUMMARY OF THE INVENTION

According to one aspect of the present invention, there is provided an internal combustion engine, comprising:

a cylinder including a combustion space;

an intake manifold from which air is drawn into said combustion space during operation of the engine;

an exhaust manifold into which exhaust gas resulting from combustion event in said combustion space is discharged;

an EGR conduit providing a path through which a portion of the exhaust gas passes into said intake manifold;

an EGR valve forming a part of an EGR passage in said EGR conduit, said EGR valve having different valve openings; and a control arrangement monitoring performance of EGR control and limiting the maximum fuel, in amount, to be drawn into said cylinder in response to the result from monitoring performance of EGR control.

The present invention provides improvements in EGR control system of an internal combustion engine by limiting the maximum fuel, in amount, to be drawn into the engine cylinder and EGR rate in response to result of monitoring performance of EGR control.

In the event when actual performance of EGR control (hereinafter abbreviated as "actual EGR performance") remains outside of a predetermined window around normal performance of EGR control (hereinafter abbreviated as "normal EGR performance"), the maximum fuel, in amount, to be drawn into the engine cylinder is reduced. At the same time, the EGR rate is suppressed by fully opening a throttle valve in the intake air path. This avoids temperature increase of the engine exhaust gases and reduces inflow of the EGR gases to a minimum level.

The reduction in the maximum fuel is determined as a function of a deviation between actual EGR performance and normal EGR performance.

According to the embodiment, amount of air to be drawn into the engine cylinder is anticipated by performing arithmetic operation involving, as a variable, mass air flow measured by an airflow meter in the intake air path. For brevity, this amount of air is referred to as "cylinder air charge". Since the engine cylinder displacement volume is invariable, cylinder air charge varies with amount of recirculated exhaust gases to be drawn into the engine cylinder. For example, with the same engine speed, cylinder air charge increases as EGR rate decreases or decreases as EGR rate increases. Thus, cylinder air charge can be used as a measure of actual EGR performance, making it possible to compare and calculate deviation between actual EGR performance and normal EGR performance.

It is determined that EGR should be inhibited when the actual EGR performance remains outside of the predetermined window around the normal EGR performance. If the EGR is to be inhibited, the maximum fuel limit criteria is altered by changing the level of maximum fuel to a lower level that may be stored as a look-up table in a memory or given by correcting a normal level of maximum fuel. Simultaneously with this alteration of the maximum fuel, desired EGR rate in EGR control is set to a minimum or zero and the throttle valve in the intake air path is fully opened to minimize inflow of EGR gases to the intake air path.

The normal EGR performance is altitude compensated since the cylinder gas charge density varies with atmospheric pressure, resulting in a decrease in the air-to-fuel ratio with increasing altitude levels. This is accomplished by monitoring the barometric pressure and adjusting the normal EGR performance in accordance with the sensed barometric pressure to provide for altitude compensation.

The normal EGR performance is altitude compensated such that the lower the barometric pressure the smaller the correction term and the higher the barometric pressure the greater the correction term.

The actual EGR performance is derived from the desired EGR rate and engine RPM.

DESCRIPTION OF THE PREFERRED EMBODIMENT

Figure 1:
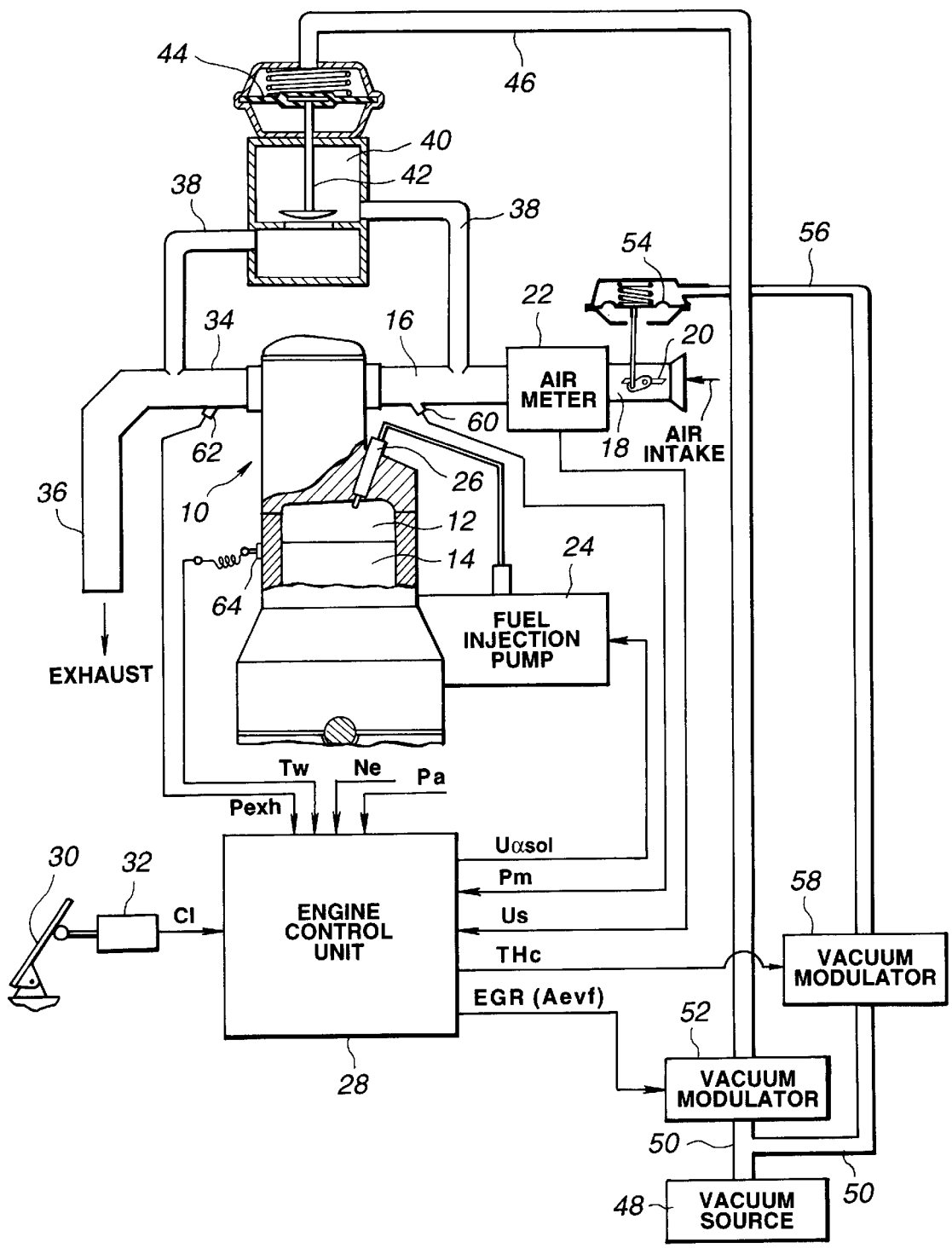
FIG. 1 is a general diagram of the engine control hardware used in accordance with a preferred embodiment of the present invention.

Referring to FIG. 1, a single cylinder of a diesel engine 10 is shown for illustrative purpose only, it being understood that the engine 10 may have any number of other cylinders as desired. The cylinder illustrated includes a combustion space 12, and a piston 14. Air is drawn into the combustion space 12 during an engine operation from an intake manifold 16 that is open to the atmosphere via an air intake conduit 18.

The conduit 18 includes a throttle valve 20. When the throttle valve 20 is fully opened, the air conduit 18 is not throttled so that the pressure in the intake manifold 16 is substantially atmospheric pressure. The conduit 18 also includes an airflow meter 22, such as of the hot wire type airflow meters, for providing a measure of the mass airflow into the engine 10. The airflow meter 22 provides an output signal Us indicative of the mass airflow (MAF) into the engine 10.

Fuel is metered into the engine cylinders through the operation of an electric governor controlled fuel pump 24 that delivers fuel pulses timed to engine rotation events to fuel injectors, such as an injector 26 that injects fuel to the combustion space 12. The pump 24 is controlled by an engine control unit 28 to meter appropriate amounts of fuel to the engine cylinders with each fuel injection event, such as determined from the timing of the engine rotation events.

Generally, the vehicle operator dictates the appropriate amounts of fuel to be metered by positioning a gas pedal 30, the position of which is converted by a pedal position sensor 32. The pedal position sensor 32 may be a potentiometer providing an output signal CI indicative of pedal 30 displacement away from a rest position to the control unit 28. A RPM signal Ne the period of which is proportional to the rate of rotation of an engine output shaft (not shown) is provided to the engine control unit 28. The control unit 28 determines final fuel amount Qsol responsive to the input signals CI and Ne. The control unit 28 generates a fuel injection amount command Uαsol responsive to the final fuel amount Qsol and the RPM signal Ne, and provides the command Uαsol to an electric governor of the pump 24. The pump 24, which includes the electric governor, may take the form of a known fuel injection pump that is described on pages B-81 to B-84 of a new model introduction manual (R50-0") entitled "NISSAN TERRANO" published in September 1995 by Nissan Motor Co., Ltd.

The electric governor can move a control sleeve for adjustment of fuel amount to be injected. Electric current passing through the electric governor induces magnetic field, causing a rotor to rotate. A shaft of the rotor is operatively connected via its eccentrically mounted ball to the control sleeve such that rotation of the rotor causes displacement of the control sleeve. The strength of the magnetic field and a force of a return spring acting on the rotor determine an angle through which the rotor rotates away from its rest position. The setting is such that increasing the current passing through the electric governor causes the rotor to increase its angle of rotation, thereby to increase displacement of the control sleeve in a direction to increase supply of fuel. The current is varied by varying duty ratio of ON-OFF of a ground circuit of the electric governor.

Exhaust gas resulting from engine cylinder combustion events is discharged into an exhaust manifold 34 and thereafter is passed through an exhaust gas conduit 36. EGR conduit 38 is provided as a path through which a controlled portion of the exhaust gas is recirculated to the engine intake 30 manifold 16, to reduce levels of NOx discharged from the engine 10, and to provide control authority over the inlet air quantity through inlet air charge dilution. An EGR passage 40 in the EGR conduit 38 contains an EGR valve 42 actuated by vacuum pressure in a vacuum actuator 44 to control a degree of the valve opening. Authority over the EGR valve 42 is thus provided by the degree of vacuum applied to the vacuum actuator 44 from a vacuum line 46. A vacuum source 48, such as a conventional vacuum pump applies a substantially steady vacuum to a vacuum line 50 when power is applied to the pump, such as when the engine 10 is operating.

A vacuum modulator 52 is disposed in the vacuum line 46 between the vacuum actuator 44 and the vacuum source 48. The vacuum modulator 52 includes an electrically-controlled solenoid valve (not shown) that opens and closes at a duty cycle dictated by a control signal EGR(Aevf) supplied to the vacuum modulator 52 from the engine control unit 28. For example, EGR(Aevf) may be a fixed frequency, fixed amplitude, variable duty ratio or cycle electrical signal.

The throttle valve 20 within the intake conduit 18 is actuated by vacuum pressure in a vacuum actuator 54. Authority over the throttle valve 20 is thus provided by the degree of vacuum applied to the vacuum actuator 54 from a vacuum line 56.

A vacuum modulator 58 is disposed in the vacuum line 56 between the vacuum actuator 54 and the vacuum source 48. The vacuum modulator 58 includes an electrically controlled solenoid valve (not shown) which opens or closes as dictated by a control signal THc supplied to the vacuum modulator 58 from the engine control unit 28.

An intake manifold pressure sensor 60 is exposed to the pressure in the intake manifold 16 developed at a portion downstream of where the recirculated exhaust gas is admitted to the intake manifold 16. The pressure sensor 60 outputs an intake manifold pressure signal Pm indicative of that pressure to the engine control unit 28. An exhaust manifold pressure sensor 62 is exposed to the pressure in the exhaust manifold 34 and outputs an exhaust manifold pressure signal Pexh indicative of that pressure. Other input signals generally recognized in conventional engine control are provided to the engine control unit 28, such as engine coolant temperature Tw, output from a conventional temperature sensor 64 in the engine coolant path, and a barometric pressure Pa, output from a conventional barometric pressure sensor (not shown).

The engine control unit 28 may include a digital computer containing such generally-known components as a central processing unit (CPU), a read only memory (ROM), a random access memory (RAM) and an input/output interface circuit (I/O). The computer periodically reads and processes inputs from engine sensors, such as the described CI, Ne, Us, Pm, Pexh, Tw, and Pa inputs, and, through execution of control routines stored in the ROM, generates and outputs a series of actuator commands, such as the described Uαsol, EGR(Aevf), and THc commands.

Figure 2:
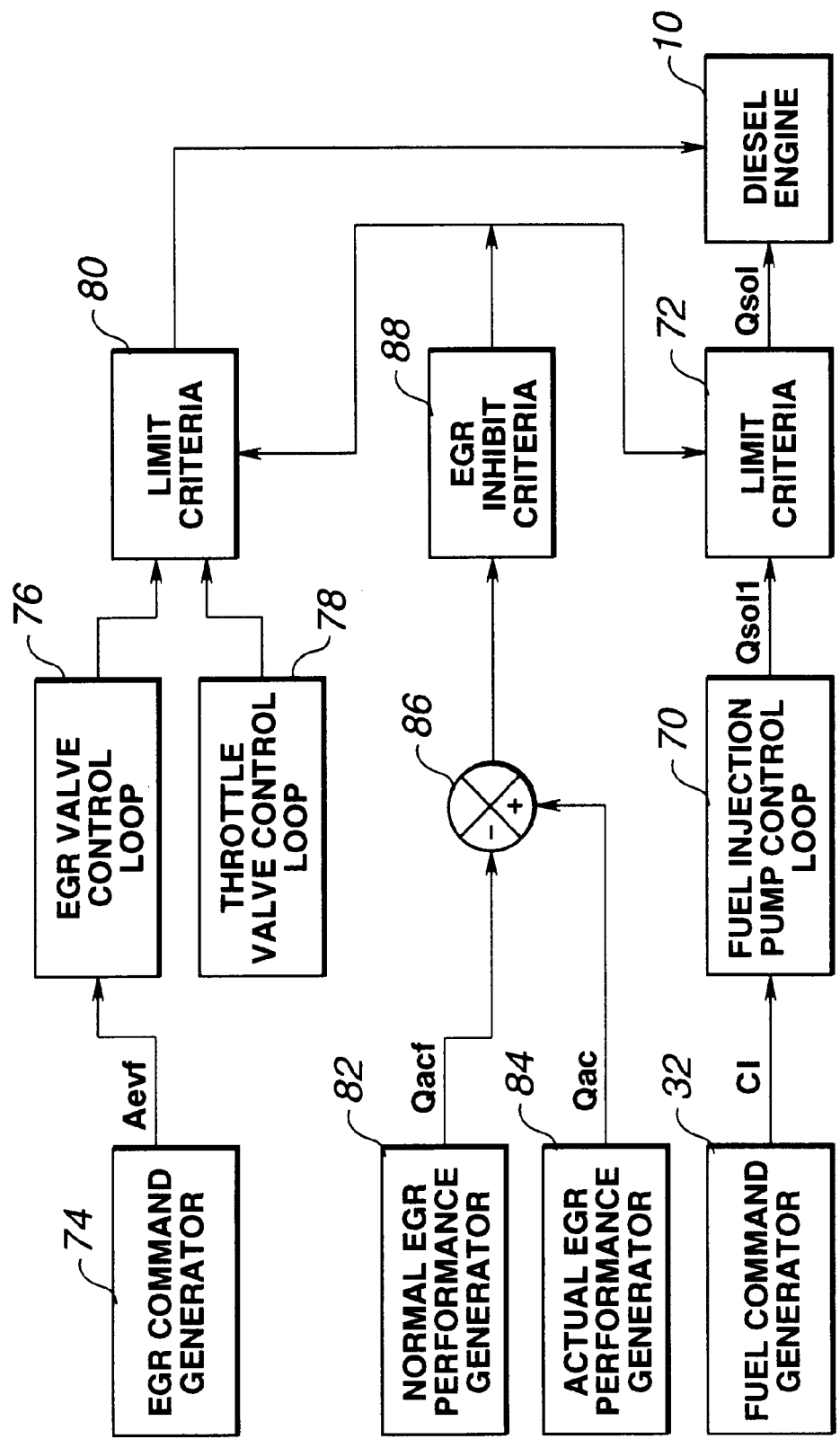
FIG. 2 is a block diagram showing control of cylinder charge through fuel injection pump control, EGR control and throttle valve control when the actual EGR performance remains outside of the normal EGR performance.
Figure 10:
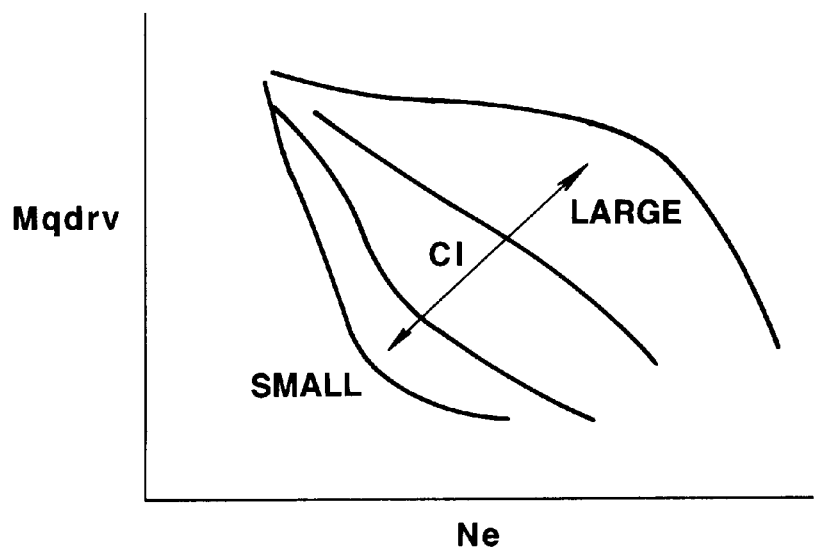
FIG. 10 is a look-up table illustrating changes in variations of a correction coefficient Mrdrv against engine RPM Ne with increasing pedal position CI of a gas pedal.

A preferred implementation of the present invention can be understood with reference to the control diagram in FIG. 2. The driver signal from the gas pedal (not shown) is used as the input to a fuel command generator 32. The fuel command generator 32 may be as simple as a pedal position sensor. The fuel command generator 32 outputs a pedal position indicative signal CI. A RPM signal Ne from an engine speed sensor (not shown) and the pedal position indicative signal CI are input to a fuel injection pump control routine 70 which outputs a base fuel amount command Qsol1 indicative of an amount of fuel to be injected into the engine cylinder. The fuel injection pump control routine 70 may include a two-dimensional look-up table (FIG. 10) in a computer memory. As shown in FIG. 10, the look-up table contains various values of Mqdrv against various combinations of values of Ne and CI. Table look-up operation of this table using the input signals CI and Ne results in generating an output signal Mqdrv. This signal Mqdrv is corrected in response to a coolant temperature signal Tw that is provided also to the box 70. The signal Mqdrv as corrected is set as the base fuel amount command Qsol1. The base fuel amount command Qsol1 is limited in a box 72 as will be explained below. The box 72 outputs a final fuel amount command Qsol indicative of a final amount of fuel to be injected into the engine cylinder. This command Qsol controls the amount of fuel to be injected into the engine cylinder of the diesel engine 10 by varying voltage signal Uαsol applied to the fuel injection pump.

Figure 4:
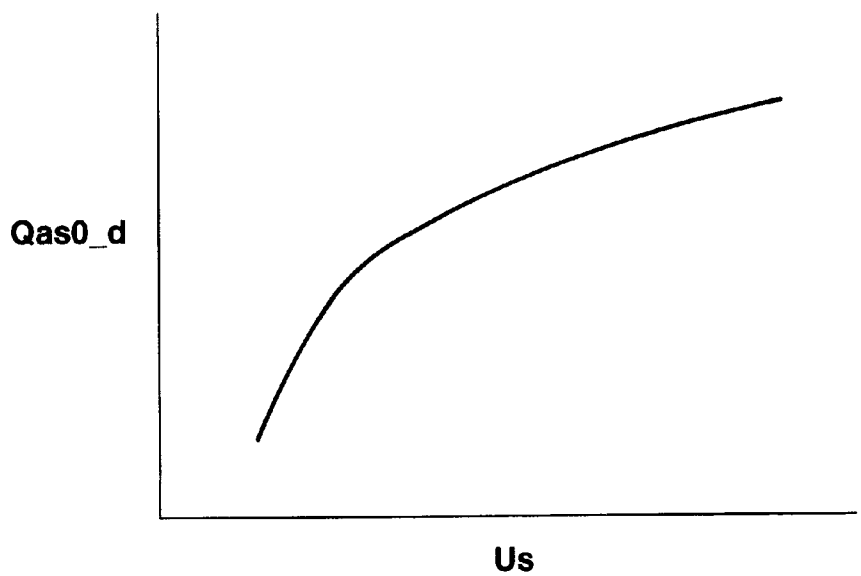
FIG. 4 is an Us-Qas0_d conversion look-up table illustrating characteristics of an airflow meter.

The output signal Us of the airflow meter 22 (see FIG. 1) is converted into instantaneous airflow Qas0_d by a conversion table (see FIG. 4) in computer memory. Weighted mean of Qas0_d is calculated and the result is set as mass airflow Qas0. Using the mass airflow Qas0 and RPM Ne, an amount of air to be distributed to the engine cylinder Qac0 is determined by calculating the following equation.

$$Qac0 = (Qas0/Ne) \times KC \qquad (1)$$

where:

KC is a constant.

The calculation of this equation is repeated in timed relation with the engine RPM. The calculation results are stored in an L-tuple register (L is an integer greater than 1) one after another and data shifted out of the register are stored one after another in a 2-tuple register as $Qac_n$ and $Qac_{n-1}$. Data $Qac_{n-1}$ is older than data $Qac_n$. Using $Qac_{n-1}$ and $Qac_n$, cylinder air charge Qac can be given by calculating the following equation.

$$Qac = Qac_{n-1} \times (1-KV) + Qac_n \times KV \qquad (2)$$

where:

KV is a constant.

The integer L is determined after due consideration of a delay taken for intake air having past the airflow meter 22 to reach the engine cylinder, In this manner, cylinder air charge Qac indicative of an amount of air to be drawn into the engine cylinder is determined with good accuracy.

Figure 18:
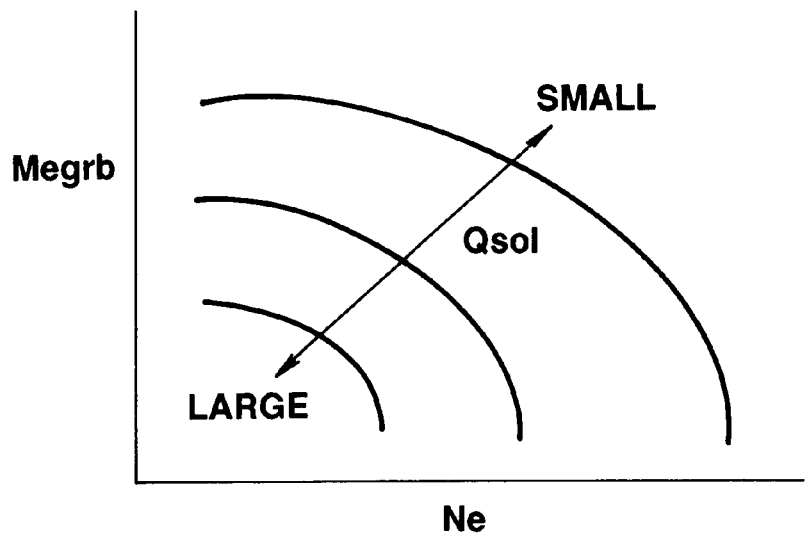
FIG. 18 is a look-up table illustrating changes in variations of base desired EGR rate Megrb against engine RPM Ne with increasing final fuel amount Qsol.
Figure 19:
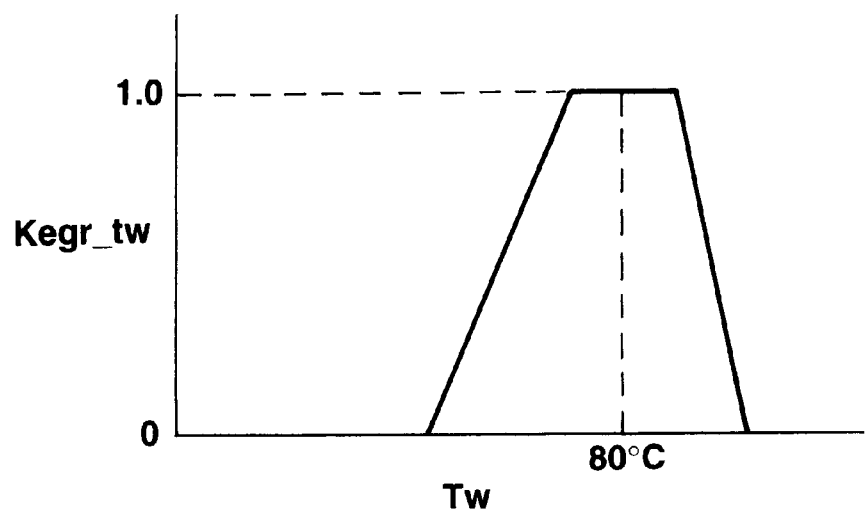
FIG. 19 is a look-up table illustrating variations of a correction coefficient Kegr_tw against coolant temperature Tw.

Data Qac (amount of air to be drawn into the engine cylinder), Qsol (final fuel amount to be injected into the engine cylinder), Ne (engine RPM), Tw (engine coolant temperature), Pm (intake manifold pressure), and Pexh (exhaust manifold pressure) are input to an EGR command generator 74. The EGR command generator 74 may include a two-dimensional look-up table (FIG. 18) in a computer memory. As shown in FIG. 18, the look-up table contains various values of base desired EGR rate Megrb against various combinations of values of Ne and Qsol. Table look-up operation of this table using the input signals Ne and Qsol results in generating an output signal Megrb. The EGR command generator 74 also includes a coefficient look-up table (FIG. 19). As shown in FIG. 19, the coefficient look-up table contains various values between 0 (zero) and 1 (one) of coefficient Kegr_tw against various values of Tw (engine coolant temperature). A desired EGR rate Megr is given by the following equation.

$$Megr = Megrb \times Kegr\_tw \qquad (3).$$

The desired EGR rate Megr as determined by calculating the equation (3) is reset to 0 (zero) in response to abnormal combustion event within the engine cylinder. The desired EGR rate Megr and Qac are used as input signals in determining an EGR gas admission amount Mqec, i.e., an mount of EGR gas to be drawn into the engine cylinder. The EGR gas admission amount Mqec is given by calculating the following equation.

$$Mqec = Qac_n \times Megr \qquad (4),$$

where:

$Qac_n$ is an instantaneous value of Qac.

Using Mqec, an intermediate variable Rqec is determined by calculating the following equation.

$$Rqec = Mqec \times KIN \times KVOL + Rqec_{n-1} \times (1 - KIN \times KVOL) \qquad (5),$$

where:

KIN is a value equivalent to volumetric efficiency;

KVOL is defined by VE/NC/VM;

VE is displacement volume;

NC is number of cylinders;

VM is intake air system volume, and $Rqec_{n-1}$ is an old value of Rqec determined immediately before.

Using Mqec and $Rqec_{n-1}$, the intermediate variable Rqec is subjected to advance correction to give a variable Tqec by calculating the following equation.

$$Tqec = GKQEC \times Mqec - (GKQEC-1) \times Rqec_{n-1} \qquad (6),$$

where:

GKTEC is an advance correction gain.

An EGR gas admission rate Tqek, i.e., an amount of EGR gas admitted to the engine cylinder over an unit amount of time, for example, a second, is determined by calculating the following equation.

$$Tqek = Tqec \times Ne / KCON \qquad (7),$$

where:

KCON is a constant that is 30 in the case of four cylinder diesel engine or 20 in the case of six cylinder diesel engine.

Intake manifold pressure signal Pm and exhaust manifold pressure signal Pexh from pressure sensors 60 and 62 (see FIG. 1) are used as the inputs to the EGR command generator 74. If it is desired to eliminate such pressure sensors 60 and 62, one may obtain intake and exhaust manifold pressure Pm and Pexh from mass air flow Qas0 that has been derived from the output Us of the airflow meter 22. Using the input signals Pm and Pexh, a value equivalent to EGR gas flow speed Cqe is determined by calculating the following equation.

$$Cqe = \sqrt{K \times (Pexh - Pm)}, \qquad (8)$$

where:

K is a constant.

Theoretically, a valve opening area Aev is expressed as;

$$Aev = Tqek / Cqe \qquad (9).$$

Figure 14:
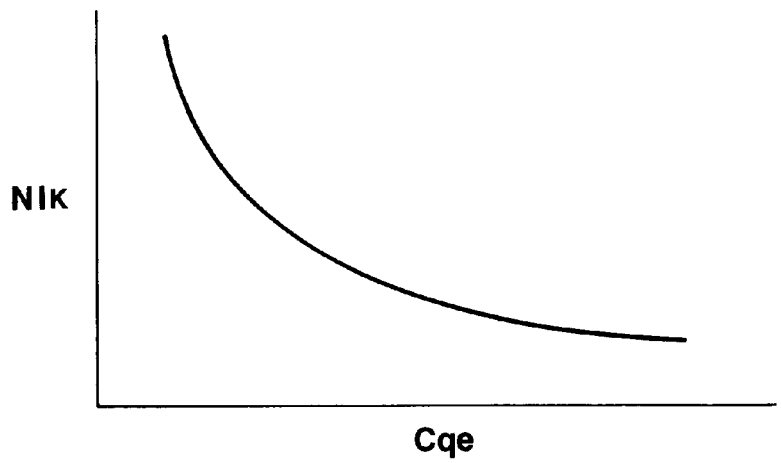
FIG. 14 is a look-up table illustrating variations of weight Nik that decreases with increasing flow speed Cqe.

The EGR command generator 74 may include a weighted mean constant look-up table (FIG. 14) in computer memory. This look-up table contains various values of weighted mean constant NIk against various values of EGR gas flow speed so that the slower the EGR gas flow speed Cqe, the greater the weighted mean constant NIk. To accomplish a small variation in EGR gas flow speed, a relatively large change in EGR valve opening area is required during operation with low EGR gas flow speed, while a relatively small change in EGR gas flow speed is required during operation with high EGR gas flow speed. Thus, the mean is heavily weighted to suppress fluctuation of EGR valve opening area during operation with low EGR gas flow speed, and it is less heavily weighed during operation with high EGR gas flow speed. Generally, EGR gas flow speed increases during transition owing to increase in difference between Pm and Pexh. This explains why the mean constant NIk is inversely proportional to EGR gas flow speed Cqe. Using the constant NIk, the weighted mean Aevf is given by calculating the following equation.

$$Aevf = Aev/2^{NIk} + (1 + \frac{1}{2}^{NIk}) \times Aevf_{n-1} \qquad (10).$$

Figure 15:
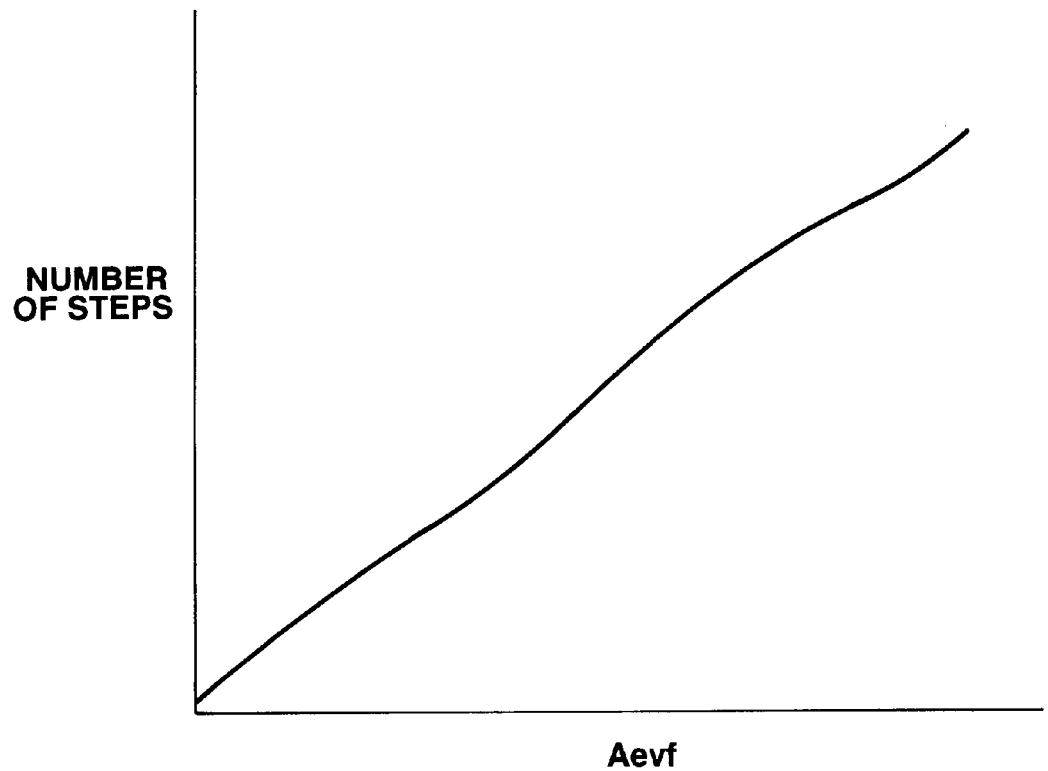
FIG. 15 is a conversion look-up table in the case where the EGR valve is actuated by an actuator including a stepping motor.

The mean Aevf is output as the desired EGR valve opening area. The desired EGR valve opening area Aevf is used as the input to an EGR valve control loop 76, which converts the input Aevf into the EGR valve control command EGR (Aevf). The EGR valve control command EGR(Aevf) is limited in a box 80 as will be explained below. Then, the EGR valve control command EGR(Aevf) is output to the vacuum modulator 52 (see FIG. 1) of the diesel engine 10. The EGR valve control loop 76 may include a look-up table as illustrated in FIG. 15 in the case where an actuator for the EGR valve employs a stepper motor instead of the vacuum modulator 52 and the diaphragm 44. The look-up table of FIG. 15 contains various values of number of steps, through which the stepping motor is to advance to open the EGR valve, against various values of the desired EGR valve opening area Aevf. Then, the EGR valve control loop 76 outputs a stepper motor control command indicative of the number of steps derived after table look-up operation of the table of FIG. 15. The stepper motor control command is limited in the box 80 and then output to the stepper motor of the diesel engine 10.

The engine coolant temperature Tw, base fuel amount Qsol1, and engine RPM Ne are used as the input to a throttle valve control loop 78, which outputs the throttle valve control command THc. The throttle valve control command THc is limited in the box 80 as will be explained below. Then, the throttle valve control command THc is output to the vacuum modulator 58 for the throttle valve 20.

In a box 84 by the name of actual EGR performance generator, the cylinder air charge Qac is used as the representative variable indicative of actual performance of EGR control. The actual EGR performance generator 84 generates the cylinder air charge Qac.

Figure 26:
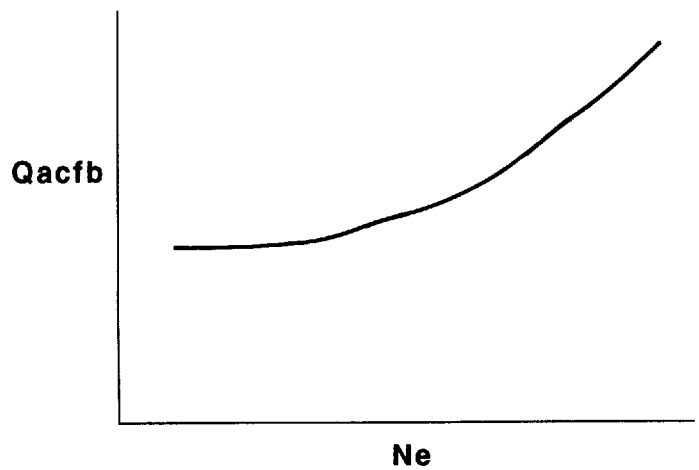
FIG. 26 is a look-up table illustrating how the base value Qacfb varies against engine RPM Ne before altitude correction.

The engine RPM Ne is used as the input to a normal EGR performance generator 82, which outputs a reference value Qacf, which cylinder air charge is to take during operation of the diesel engine 10 with normal performance of EGR control. The normal EGR performance generator 82 may include a look-up table (see FIG. 26) in computer memory. As shown in FIG. 26, the look-up table contains various values of a reference base Qacfb against various values of the engine RPM Ne. In accordance with the usual schedule of EGR rate, the desired EGR rate (Megr) decreases as the engine RPM (Ne) increases. Reflecting the pattern of variation of the desired EGR rate (Megr), the reference base Qacfb increases as the engine RPM (Ne) increases in accordance with the curve in FIG. 26. Using the reference base Qacfb, the reference value Qacf is given by calculating the following equation.

$$Qacf = Qacf_{n-1} \times (1-KV) + Qacfb \times KV \quad (11),$$

where:
KV is a constant; and
$Qacf_{n-1}$ is an old value of Qacf determined immediately before.

Figure 27:
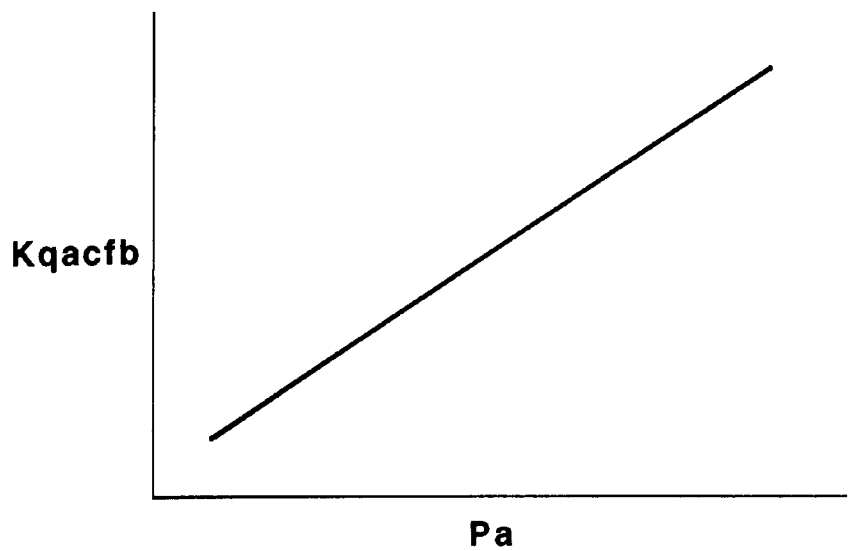
FIG. 27 is a look-up table illustrating how altitude correction coefficient Kqacfb varies against barometric pressure Pa.

In certain circumstances, the data Qacfb in the table shown in FIG. 26 need altitude compensation because the cylinder gas charge density varies with atmospheric pressure. If need arises for altitude compensation, the barometric pressure Pa may be used as the input to the box 82. The box 82 may include an altitude-compensation coefficient look-up table as shown in FIG. 27. As shown in FIG. 27, the look-up table contains various values of altitude-compensation coefficient Kqacfb against various values of barometric pressure Pa. Table look-up operation of this table using the input Pa results in generating the coefficient Kqacfb. The data resulting from the table look-up operation of FIG. 26 is subjected to the altitude compensation. To avoid confusion, the result of table look-up operation of FIG. 26 is set as Qacfb1. Then, the data Qacfb1 is altitude compensated as, $$Qacfb = Qacfb1 \times Kqacfb \quad (12).$$

Figure 28:
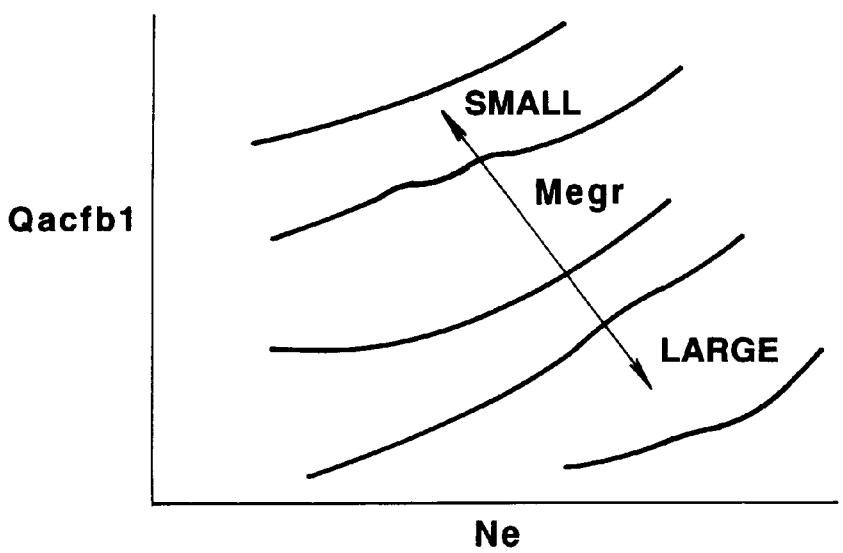
FIG. 28 is a look-up table illustrating changes in variations base value Qacfb1 prior to altitude correction against engine RPM Ne with increasing desired EGR rate Megr.

Referring to FIG. 18 and equation (3), the desired EGR rate Megr is a function of Ne, Qsol, and Tw. Thus, the data Qacfb1 that has been obtained from FIG. 26 may loose is reliability in some circumstances. FIG. 28 shows a look-up table illustrating the relationship between the reference base Qacfb1, engine RPM Ne, and desired EGR rate Megr. This look-up table contains various values of Qacfb1 against various combinations of values of Megr and Ne. Table look-up operation of this table using Ne and Megr results in generating Qacfb1. Using the table of FIG. 28, accuracy and reliability of the reference base Qacfb1 improve.

From Qacfb1, the equation (12) gives the reference base Qacfb and then the equation (11) gives the reference value Qacf. The normal EGR performance generator 82 generates the reference value Qacf.

The cylinder air charge Qac from the box 84 and the reference value Qacf from the box 82 are input to a comparison block 86, which compares Qac with Qacf. An error signal, which is expressed as Qac−Qacf, is generated as the output of the comparison block 86 and used as the input to a box 88 called "EGR inhibit criteria." In the box 88, the error signal Qac−Qacf is compared with a first predetermined value α (alpha) that is greater than zero. If the error signal Qac−Qacf is not greater than α, it is compared with a second predetermined value −β (beta) that is less than zero. The box 88 may include a counter called "Ctregng" that is incremented whenever Qac falls outside a predetermined window around Qacf. The predetermined window is limited by α+ Qacf and Qacf−β. The counter decreases whenever Qac falls in the predetermined window around Qacf. In the box 88, it is determined whether the counter Ctregng has exceeded a predetermined value CTREGJ. If this is the case, it is judged that performance of EGR control is not normal. If this is not the case, it is judged that performance of EGR control is normal. The box 88 generates an output signal indicative of the result of the judgement.

In the box 80, the EGR valve control command from the EGR valve control loop 76 is limited as follows. The output signal of the box 88 is fed as the input to the box 80. When the output signal of the box 88 indicates that the performance of EGR control is abnormal, the desired EGR rate that is determined from the equation (3) is reset to 0 (zero).

In the box 80, the throttle valve control command THc from the throttle valve control loop is limited as follows. When the performance of EGR control is abnormal, the throttle valve control command THc is modified so that the throttle valve 20 moves quickly to its fully open position. This minimizes inflow of exhaust gas into the intake manifold 16.

The output signal of the box 88 is fed as the input to the box 72. In the box 72, the base fuel amount command Qsol1 from the fuel injection pump control loop 70 is limited as follows. The box 72 compares Qsol1 with the maximum fuel Qful. The box 72 outputs Qsol1 as Qsol as long as Qsol1 is less than Qful. However, when Qsol1 is not less than Qful, the box 72 outputs Qful as Qsol.

When the output signal of the box 88 indicates that the performance of EGR control is normal, a normal mode maximum fuel Qfuln is used as Qful. When the output signal of the box 88 indicates that the performance of EGR control is abnormal, an abnormal mode maximum fuel Qfludg is used as Qful.

Figure 8:
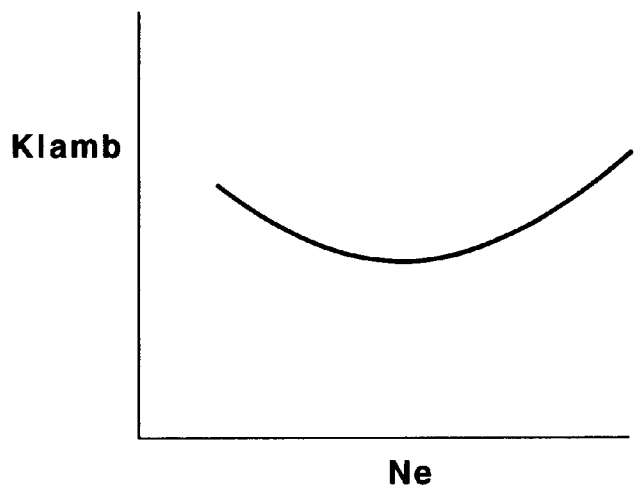
FIG. 8 is a look-up table illustrating variations of a coefficient Klamb against engine RPM Ne.
Figure 31:
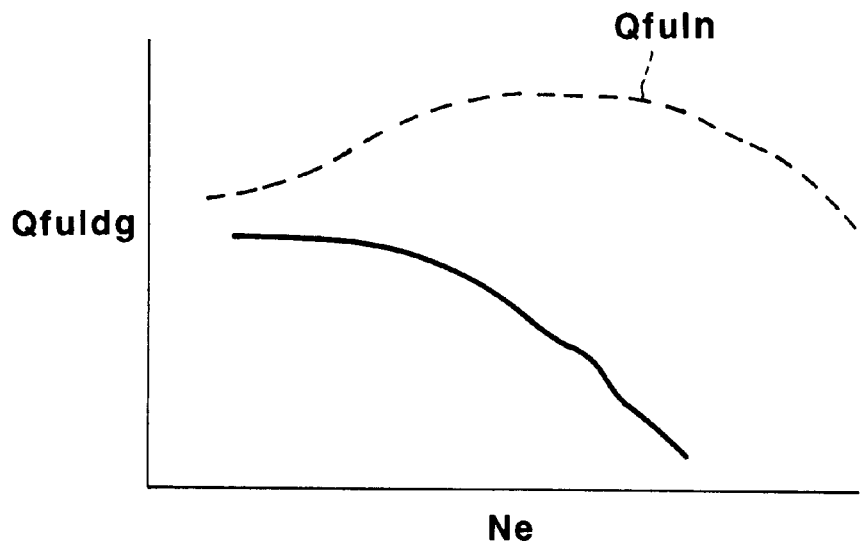
FIG. 31 is a look-up table illustrating variations of Qfuldg against Ne in comparison with variations of Qful against Ne.

The normal mode maximum fuel Qfuln is given by calculating the following equation.

$$Qfuln = Qac \times (Klamb)^{-1} \times (14,7)^{-1} \quad (13),$$

where:
Klamb is an excess air ratio.
The box 72 may include a look-up table as shown in FIG. 8, which contains various values of Klamb against various values of RPM Ne. In FIG. 31, the broken line curve shows one example of variation of Qfuln against engine RPM Ne.

The box 72 may include a look-up table as illustrated by the fully drawn curve in FIG. 31. This look-up table contains various values of abnormal mode maximum fuel Qfuldg against various value of engine RPM Ne. Thus, Qfuldg is gen by performing a table look-up operation of FIG. 31 using Ne. From comparison of the fully drawn curve with the broken line curve in FIG. 31, it will be understood that when the performance of EGR control is abnormal, the final fuel amount Qsol is reduced to a minimum level to ensure smoke-free combustion.

Figure 32:
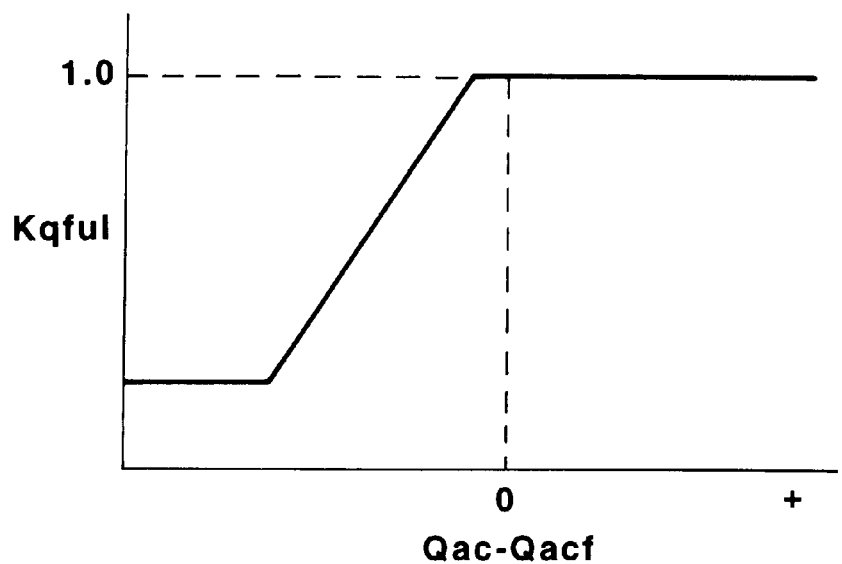
FIG. 32 is a look-up table illustrating a correction coefficient Kqful against deviation between actual and normal EGR performance Qac−Qacf.

The box 72 may include a look-up table as shown in FIG. 32. This look-up table contains various values of a coefficient Kqful against various values of the error Qac−Qacf. The values of Kqful are always not greater than 1 (one). Kqful is always 1 (one) as long as Qac falls in the predetermined window around Qacf and Qac is greater than Qacf. When Qac is less than the lower limit of the predetermined window around Qacf, Kqful decreases as Qac decreases. Using this coefficient Kqful and Qfuln that is given by the equation (13), the abnormal maximum fuel Qfuldg is given by calculating the following equation.

$$Qfuldg = Qfuln \times Kqful \qquad (14).$$

The flowcharts in FIGS. 3, 5–7, 9, 11, 13, 16–17, 20–25, 29 and 30 illustrate control routine of the preferred implementation of the present invention.

Figure 3:
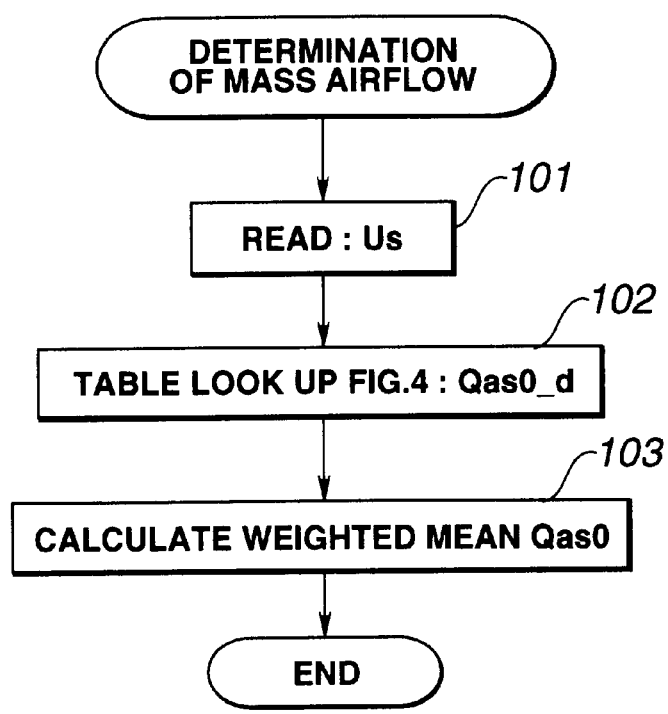
FIG. 3 is a computer flowchart illustrating steps to determine mass airflow Qas0.

Execution of the flowchart of FIG. 3 is initiated upon elapse of 4 ms (milliseconds) to determine mass airflow Qas0.

In input step 101, the engine control unit 28 performs reading operation of output signal Us from the airflow meter 22. In step 102, the control unit 28 performs table look-up operation of FIG. 4 using the input Us to determine instantaneous airflow Qas0_d. In step 103, using sufficient number of determined data of instantaneous airflow Qas0_d, the control unit 28 determines weighted means to give the result as the mass airflow Qas0.

Figure 5:
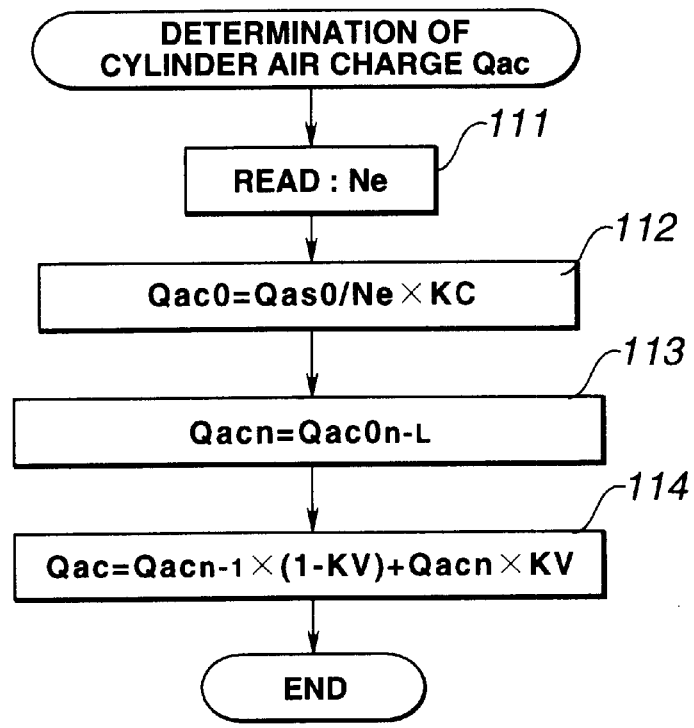
FIG. 5 is a computer flowchart illustrating steps to determine cylinder air charge Qac, i.e., amount of air to be drawn into the engine cylinder.

Execution of the flowchart of FIG. 5 is initiated in timed relationship with the engine RPM to determine cylinder air charge Qac, i.e., a an amount of fresh air to be drawn into the engine cylinder.

In input step 111, the control unit 28 performs reading operation of engine RPM Ne. In step 112, the control unit 28 performs calculation of the equation (1) using the input RPM Ne to determine and store Qac0. In step 113, the control unit 28 selects the oldest one among a predetermined number (L) of sequentially stored data of Qac0 and sets the selected oldest data $Qac0_{n-L}$ as the preset data $Qac0_n$. In step 114, the control unit 28 performs calculation of equation (2) to determine cylinder air charge Qac.

Figure 6:
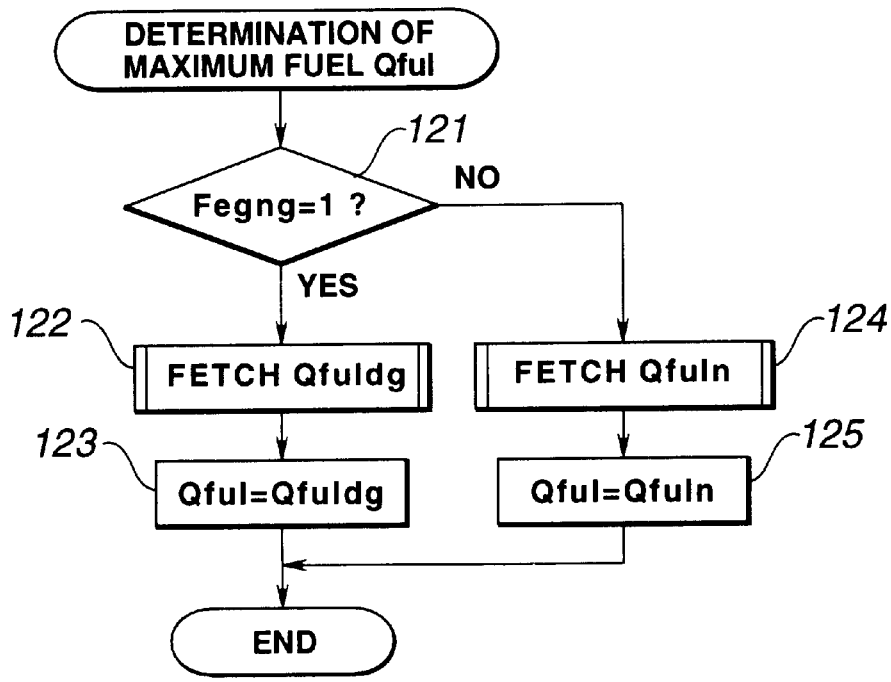
FIG. 6 is a computer flowchart illustrating steps to determine maximum fuel Qful, i.e., an upper limit of amount of fuel to be injected into the engine cylinder.

Execution of the flowchart of FIG. 6 is initiated in timed relation with the engine RPM to determine maximum fuel Qful.

In step 121, the control unit 28 determines whether or not a flag Fegng is set. The flag Fegng is set or reset after execution of flowchart of FIG. 21. The flag Fegng is set when performance of EGR control is normal and reset when performance of EGR control is abnormal. Assuming now that Fegng is reset indicating that the performance of EGR control is normal, the control unit 28 inputs normal mode maximum fuel Qfuln in step 124 and sets the input Qfuln as the maximum fuel Qful in step 125. The normal mode maximum fuel Qfuln is determined after execution of flowchart of FIG. 7. Immediately after Fegng has been set indicating the performance of EGR control has entered abnormal mode, the control unit 28 inputs abnormal mode maximum fuel Qfuldg in step 122 and sets the input Qfuldg as the maximum fuel Qful in step 123.

Figure 7:
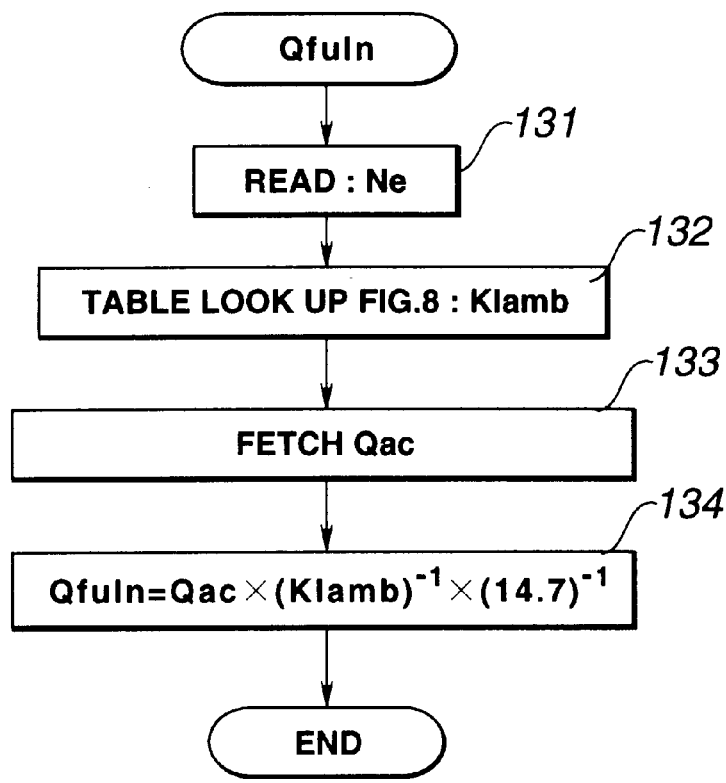
FIG. 7 is a computer flowchart illustrating steps to determine maximum fuel Qfuln for normal operation mode where the actual EGR performance Qac falls in a predetermined window around the normal EGR performance Qacf.

Execution of flowchart of FIG. 7 is initiated in timed relation with the engine RPM to determine the normal mode maximum fuel Qfuln.

In step 131, the control unit 28 performs reading operation of engine RPM Ne. In step 132, the control unit 28 performs table look-up operation of FIG. 8 using the input Ne to determine an equivalent critical excess air ratio Klamb. The table of FIG. 8 contains equivalent smoke limits of excess air ratio against various values of engine RPM Ne. In step 134, the control unit 28 performs calculation of equation (13) to determine the normal mode maximum fuel Qfuln.

Figure 9:
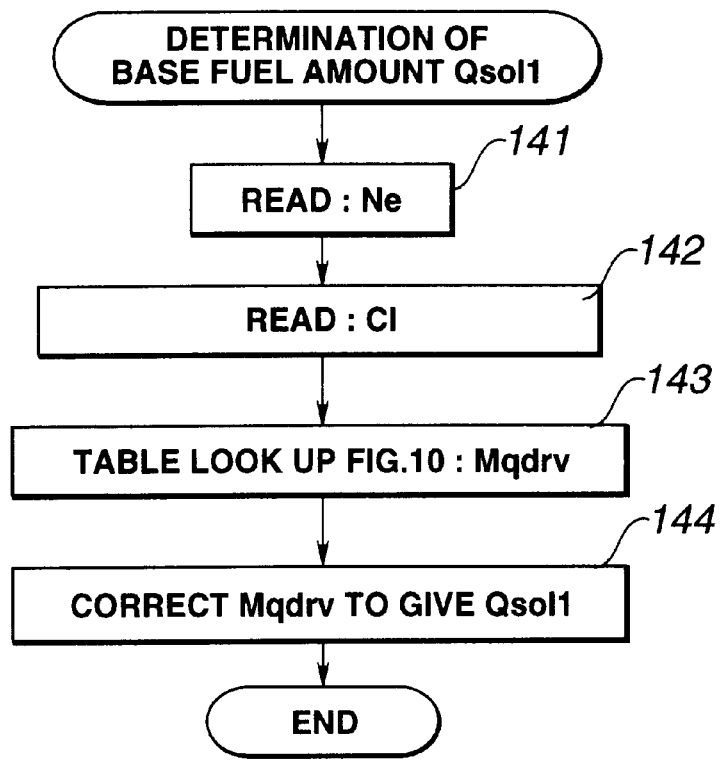
FIG. 9 is a computer flowchart illustrating steps to determine a base fuel amount Qsol1, i.e., a base amount of fuel to be injected into the engine cylinder.

Execution of flowchart of FIG. 9 is initiated in timed relation with engine RPM to determine the base fuel (injection) amount command Qsol1.

In step 141, the control unit 28 performs reading operation of engine RPM Ne. In step 142, the control unit 28 performs reading operation of gas pedal position CI. In step 143, the control unit 28 performs table look-up operation of FIG. 10 using the input Ne and CI to determine Mqdrv. In step 144, the determined Mqdrv is corrected by a correction factor, such as a correction factor variable with coolant temperature Tw and Mqdrv as corrected is set as base fuel (injection) amount command Qsol1.

Figure 11:
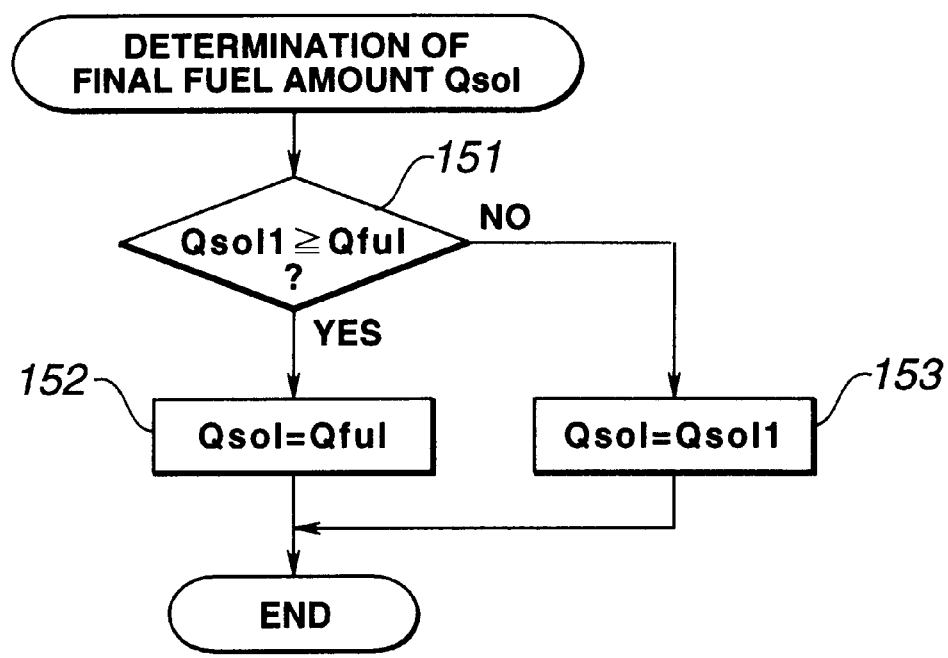
FIG. 11 is a computer flowchart illustrating steps to determine a final fuel amount Qsol, i.e., a final amount of fuel to be injected into the engine cylinder.

Execution of flowchart of FIG. 11 is initiated in timed relation with engine RPM to determine final fuel (injection) amount Qsol.

In step 151, the control unit 28 determines whether or not the base fuel amount Qsol1 exceeds the maximum fuel Qful. If this is the case, the control unit 28 sets, in step 152, the maximum fuel Qful as the final fuel amount Qsol. If Qsol1 is less than Qful, the control unit 28 sets Osol1 as Qsol.

Figure 12:
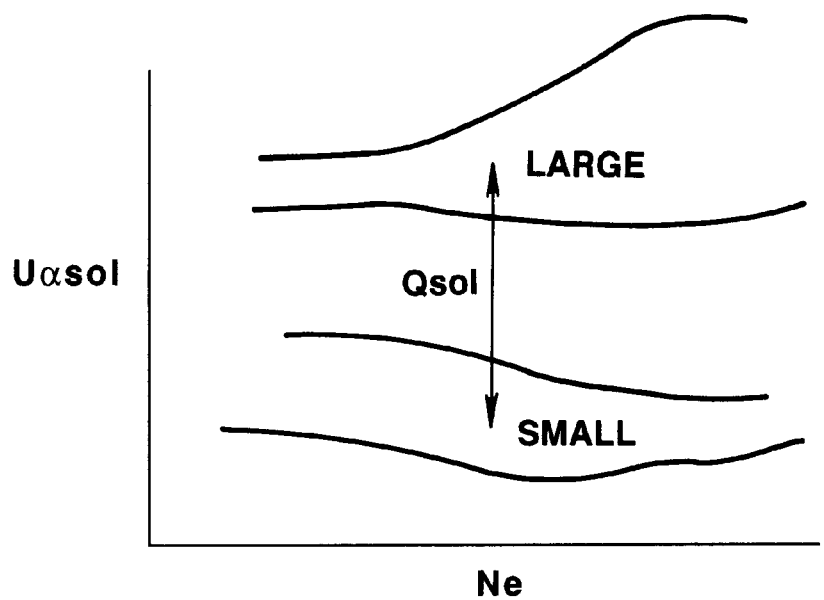
FIG. 12 is a look-up table illustrating changes in variations of a fuel injection pump applied voltage Uαsol against engine RPM Ne with increasing final fuel amount Qsol.

Using conversion table as shown in FIG. 12, the control unit 28 determines fuel command Uαsol, applied to the fuel injection pump 24, against combination of RPM Ne and final fuel amount Qsol.

Figure 13:
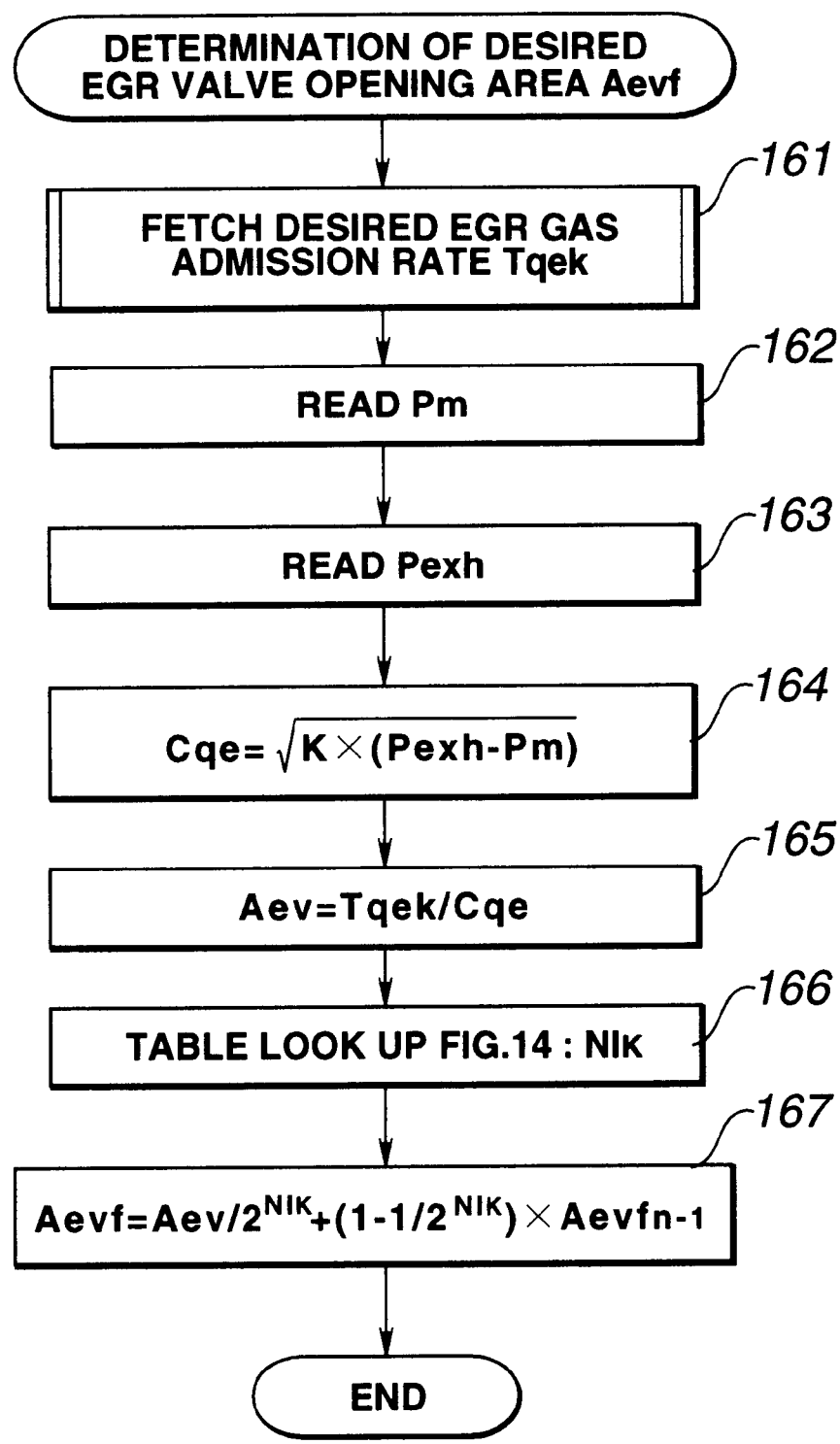
FIG. 13 is a computer flowchart illustrating steps to determine desired opening area Aevf of the EGR valve.

Execution of flowchart of FIG. 13 is initiated in timed relation with engine RPM to determine desired EGR valve opening area Aevf of EGR valve 42.

Figure 16:
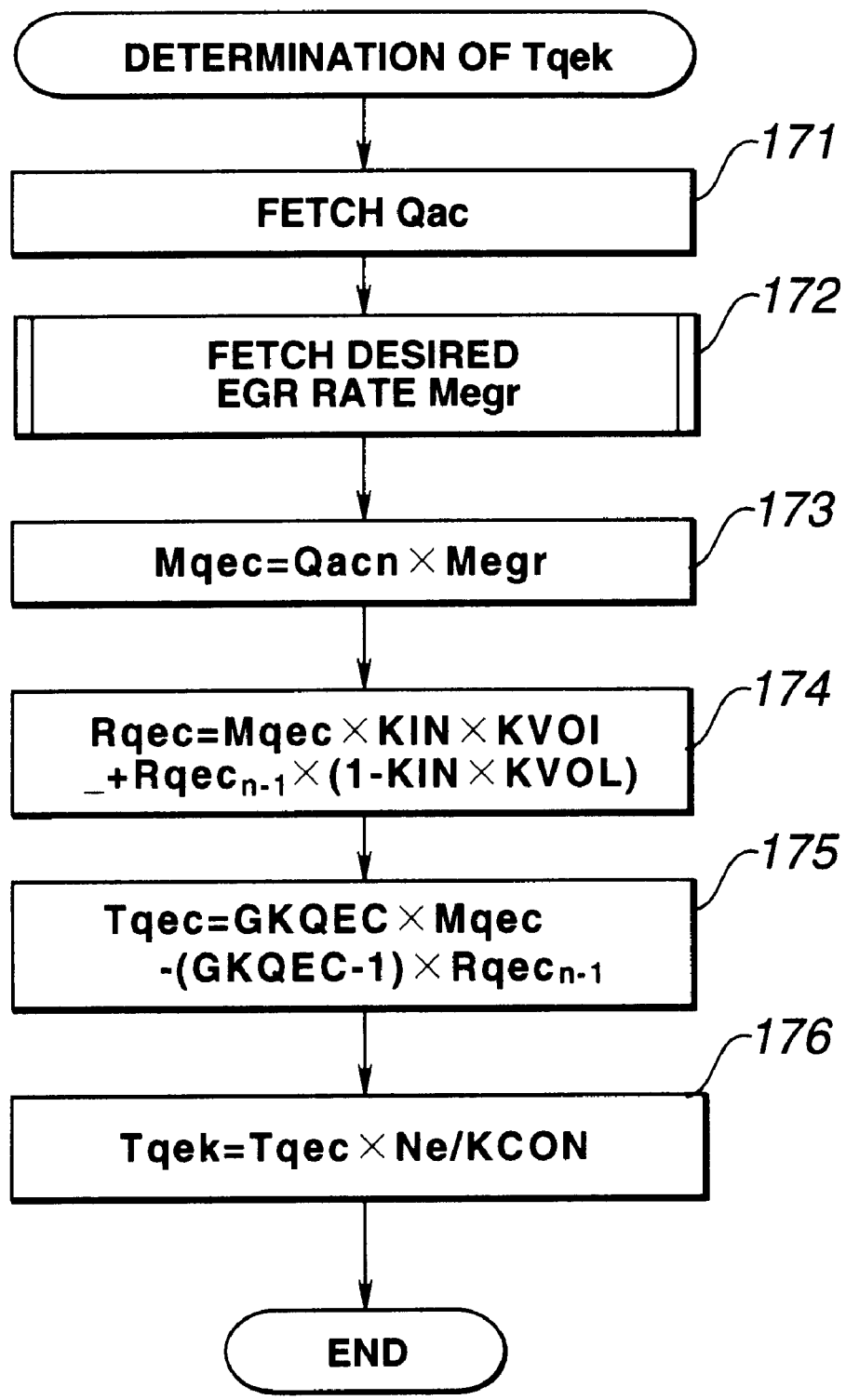
FIG. 16 is a computer flowchart illustrating steps to determine a desired EGR amount per unit amount of time Tqek.

In step 161, the control unit 28 inputs desired EGR gas admission rate Tqek that has been determined after execution of flowchart of FIG. 16. In step 162, the control unit 28 performs reading operation of intake manifold pressure Pm. In step 163, the control unit 28 performs reading operation of Pexh. In step 164, the control unit 28 performs calculation of equation (8) to determine flow speed Cqe of EGR gas through EGR conduit 38. In step 165, the control unit 28 performs calculation of equation (9) to determine valve opening area Aev. In step 166, the control unit 28 performs table look-up operation of FIG. 14 using flow speed Cqe to determine weighted mean constant Nik. In step 167, the control unit 28 performs calculation of equation (10) to determine the EGR valve opening area Aevf.

Using a conversion table, not shown, the control unit 28 converts the determined Aevf to EGR valve control command EGR(Aevf) that is applied to the vacuum modulator 52 (see FIG. 1). If the EGR valve 42 is activated by actuator using stepper motor. In this case, the control unit 28 uses the conversion table as shown in FIG. 15 to determine number of steps to be applied to the stepper motor.

Execution of flowchart of FIG. 16 is initiated in timed relation with the engine RPM to determine desired EGR gas admission rate Tqek.

In step 171, the control unit 28 inputs cylinder air charge Qac. In step 172, the control unit 28 inputs desired EGR rate Megr that is determined after execution of flowchart of FIG. 17. In step 173, the control unit 28 performs calculation of equation (4) to determine EGR gas admission amount Mqec. In step 174, the control unit 28 performs calculation of equation (5) to determine intermediate variable Rqec. In step 175, the control unit 28 performs calculation of equation (6) to determine variable Tqec. In step 176, the control unit 28 performs calculation of equation (7) to determine EGR gas admission rate Tqek.

Figure 17:
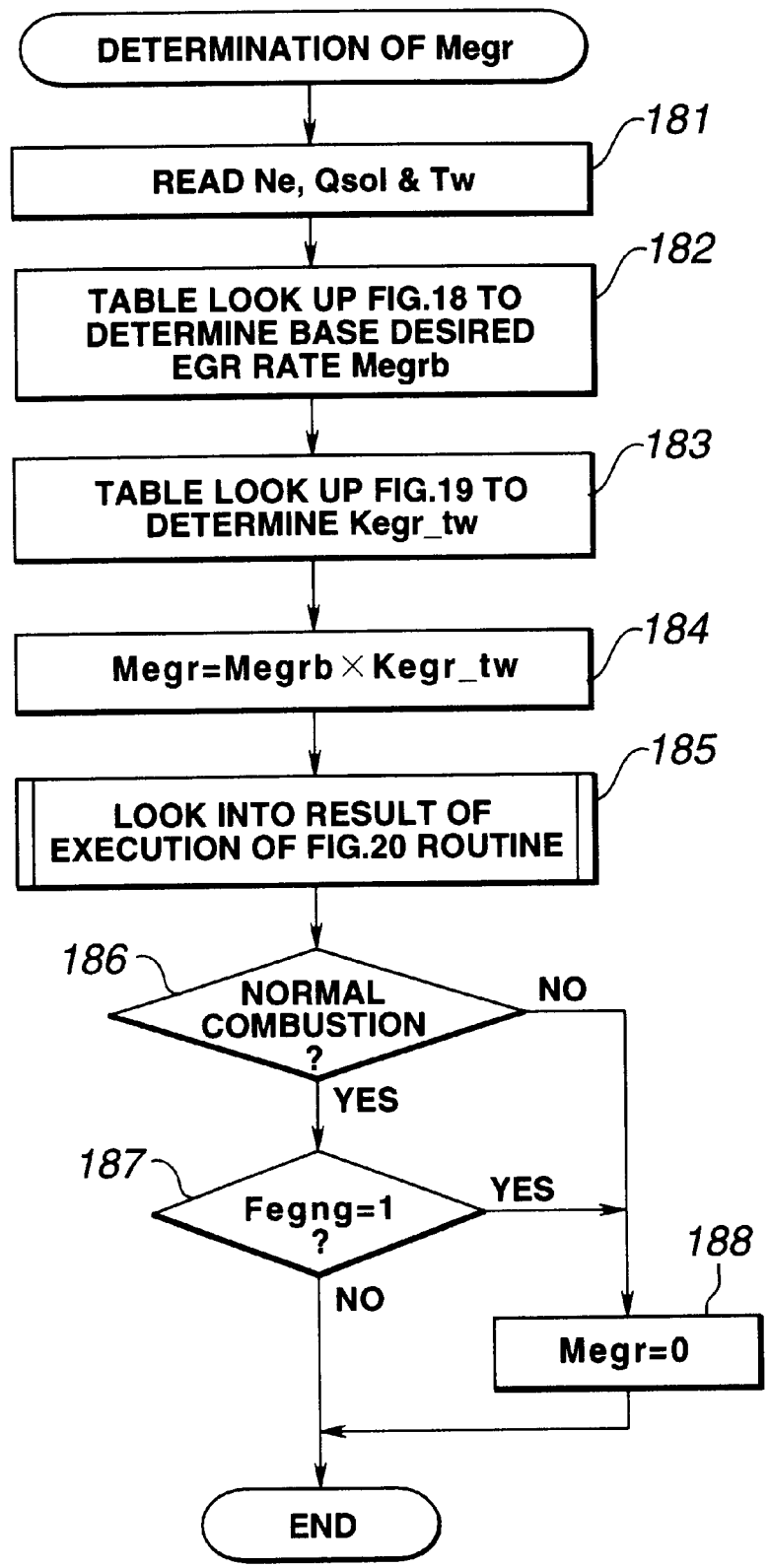
FIG. 17 is a computer flowchart illustrating steps to determine a desired EGR rate Megr.

Execution of flowchart of FIG. 17 is initiated in timed relation with engine RPM to determine desired EGR rate Megr.

In step 181, the control unit 28 inputs engine RPM Ne, final fuel amount Qsol, and coolant temperature Tw. In step 182, the control unit 28 performs table look-up operation of FIG. 18 using Qsol and Ne to determine base desired EGR rate Megrb. In step 183, the control unit 28 performs table look-up operation of FIG. 19 using coolant temperature Tw to determine coefficient Kegr_tw. In step 184, the control unit 28 performs calculation of equation (3) to determine desired EGR rate Megr. In step 186, the control unit 28 looks into and stores the result from executing flowchart of FIG. 20. In step 186, the control unit 28 determines whether or not normal combustion event has occurred. If this is the case, the control unit 28 determines, in step 187, whether or not flag Fegng is set. If this is not the case, the control unit 28 leaves the determined Megr as it is. The control unit 28 resets the determined Megr equal to 0 (zero) in response to abnormal combustion event or when the flag Fegng is set. Simultaneously with abnormal combustion event or abnormal performance of EGR control, the control unit 28 modifies throttle command THc so that the throttle valve moves quickly to the fully open position.

Figure 20:
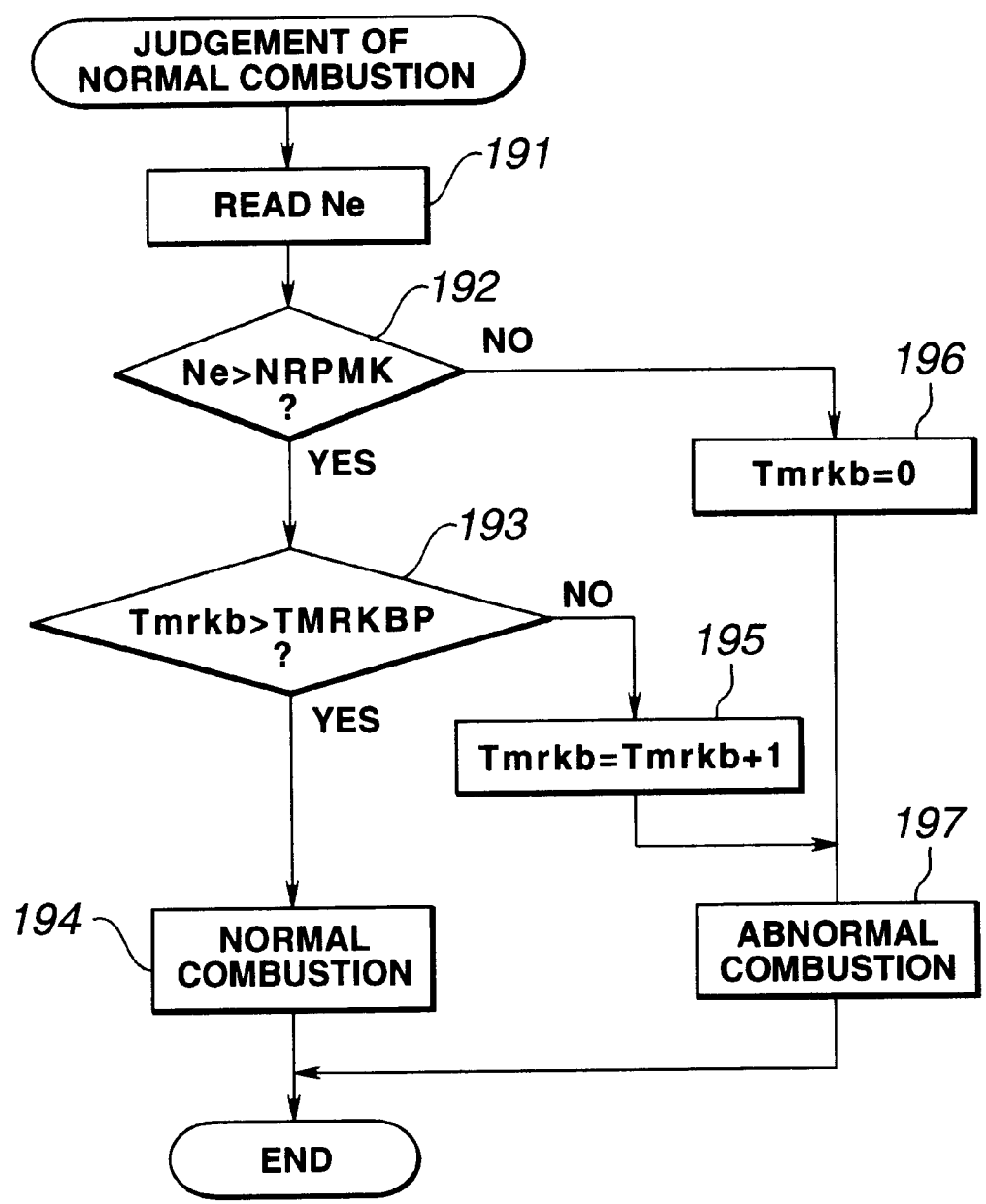
FIG. 20 is a computer flowchart illustrating steps to monitor combustion events.

Execution of flowchart of FIG. 20 is initiated upon elapse of 10 ms (milliseconds) to determine whether normal combustion event or abnormal combustion event has occurred.

In step 191, the control unit 28 performs reading operation of engine RPM Ne. In step 192, the control unit 28 determines whether Ne is greater than a slice level NRPMK for normal combustion judgement. If this is the case, the control unit 28 determines, in step 193, whether counter Tmrkb is greater than a predetermined number TMRKBP. If this is the case, the control unit 28 confirms, in step 194, occurrence of normal combustion event. If, in step 192, Ne is not greater than NRPMK, the control unit 28 resets, in step 196, the counter Tmrkb, and confirms, in step 197, occurrence of abnormal combustion event. If, in step 193, counter Tmrkb is not greater than TMRKBP, the control unit 28 increases, in step 195, counter Tmrkb by one, and confirms, in step 197, occurrence of abnormal combustion event.

The process employed by the flowchart of FIG. 20 is to confirm occurrence of normal combustion event after engine RPM Ne has stayed above the predetermined value, for example, 400 rpm, for a predetermined period of time.

Figure 21:
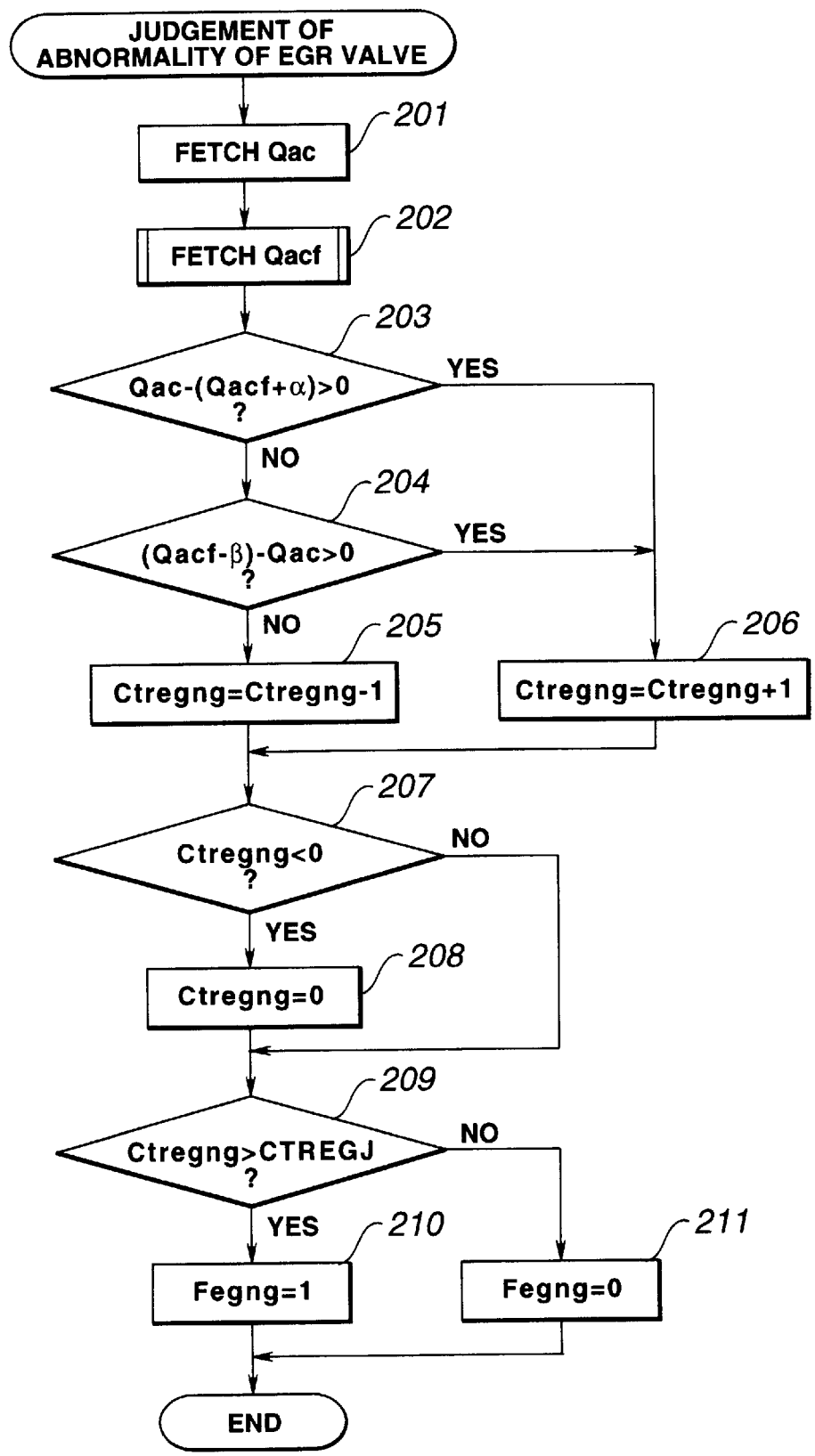
FIG. 21 is a computer flowchart illustrating steps to monitor EGR valve.

Execution of flowchart of FIG. 21 is initiated to determine whether or not performance of EGR control is normal.

In step 201, the control unit 28 inputs Qac (cylinder air charge). In step 202, the control unit 28 inputs reference value Qacf that has been determined after execution of flowchart of FIG. 22. In step 203, the control unit 203 determines whether or not Qac is greater than Qacf+$\alpha$. If this is the case, the control unit 28 increases, in step 206, counter Ctregng. If, in step 203, Qac is not greater than Qacf+$\alpha$, the control unit 28 determines, in step 204, whether Qac is less than Qacf−$\beta$. If this is the case, the control unit 28 increments, in step 206, counter Ctregng. If, in step 204, Qac is not less than Qacf−$\beta$, the control unit 28 decreases, in step 205, counter Ctregng. In step 207, the control unit 28 determines whether or not counter Ctregng is less than 0 (zero). If this is the case, the control unit 28 resets counter Ctregng equal to 0 (zero). Then, the control unit 28 goes to step 209. If, in step 207, counter Ctregng is not less than 0 (zero), the control unit 28 goes to step 209 with counter Ctregng unmodified. In step 209, the control unit 28 determines whether or not counter Ctregng is greater than predetermined value CTREGJ. If this is the case, the control unit 28 sets, in step 210, flag Fegng. If this is not the case, the control unit 28 resets, in step 211, flag Fegng. The fact that the flag Fegng is set means that the performance of EGR control is abnormal. The fact that the flag Fegng is reset means that the performance of EGR control is normal.

Figure 22:
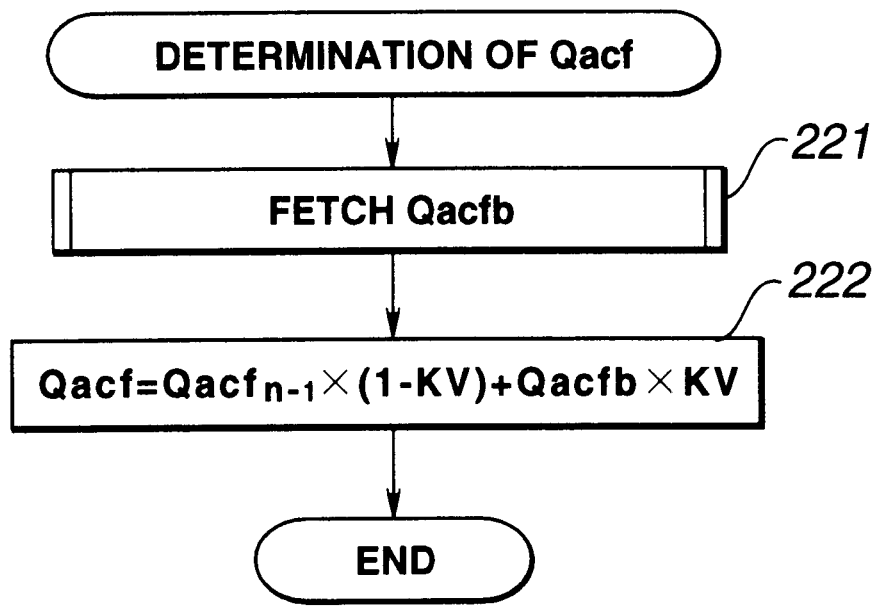
FIG. 22 is a computer flowchart illustrating steps to determine normal EGR performance Qacf.

Execution of flowchart of FIG. 22 is to determine reference value Qacf.

Figure 23:
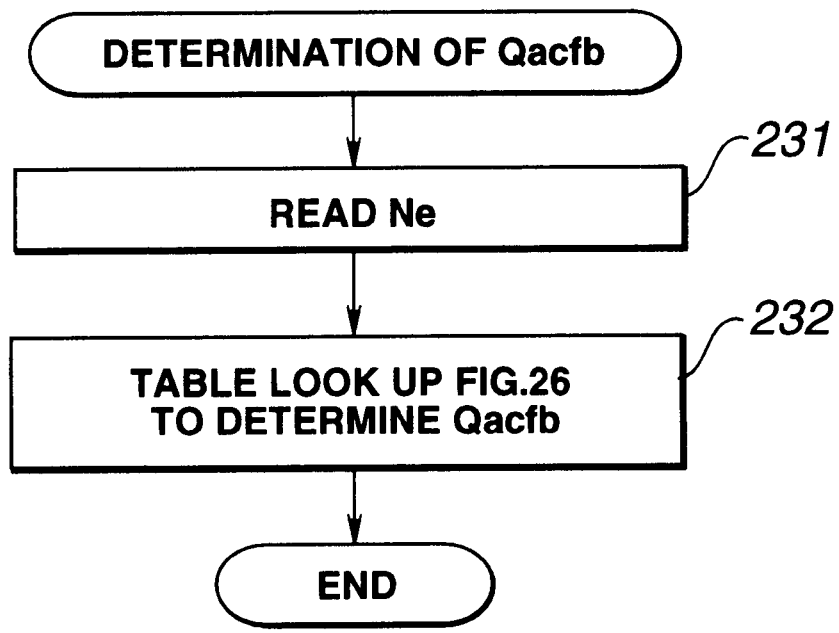
FIG. 23 is a computer flowchart illustrating steps to determine a base value Qacfb that is used in determining the normal EGR performance Qacf.
Figure 24:
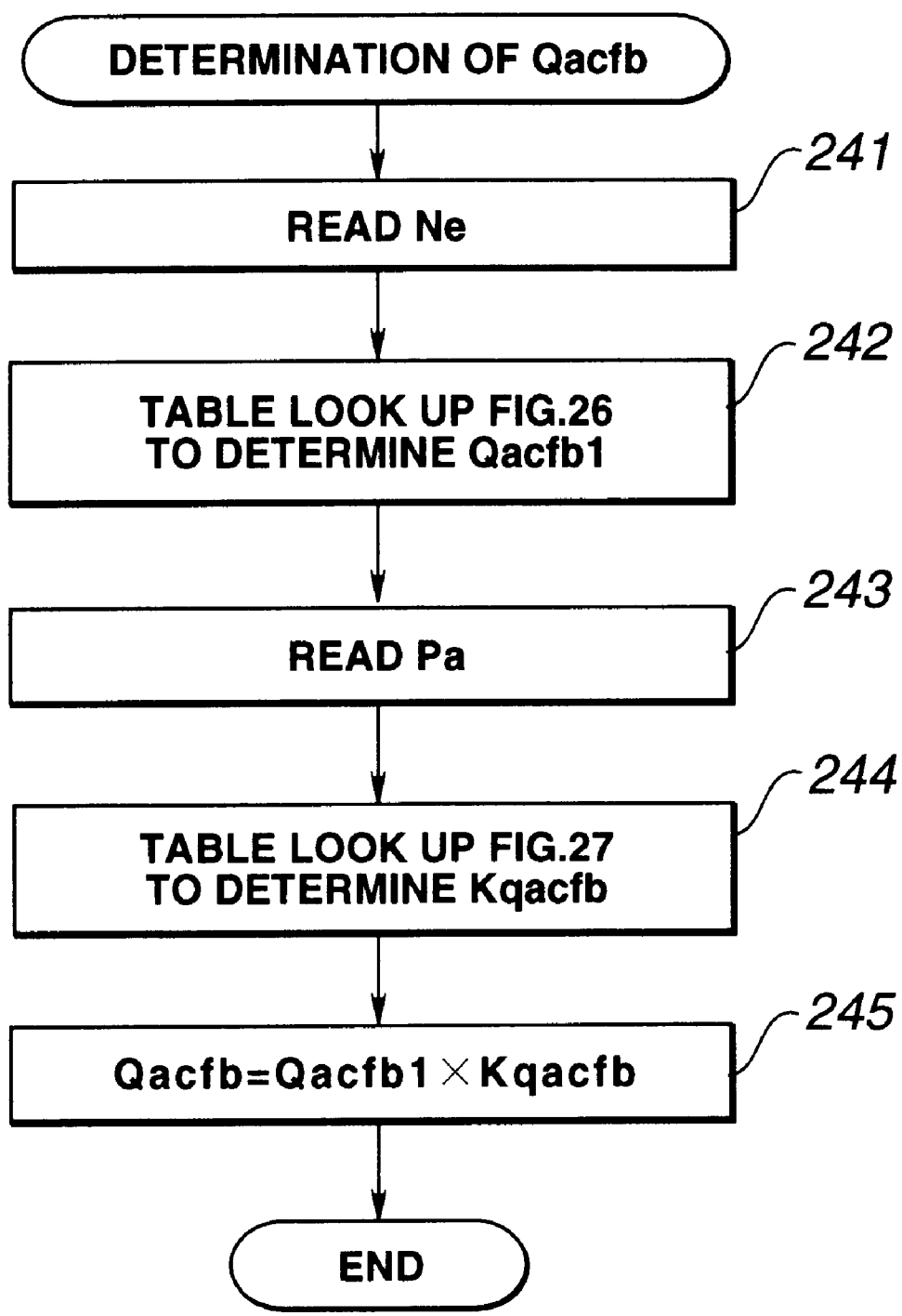
FIG. 24 is a computer flowchart illustrating another manner of determining a base value Qacfb.
Figure 25:
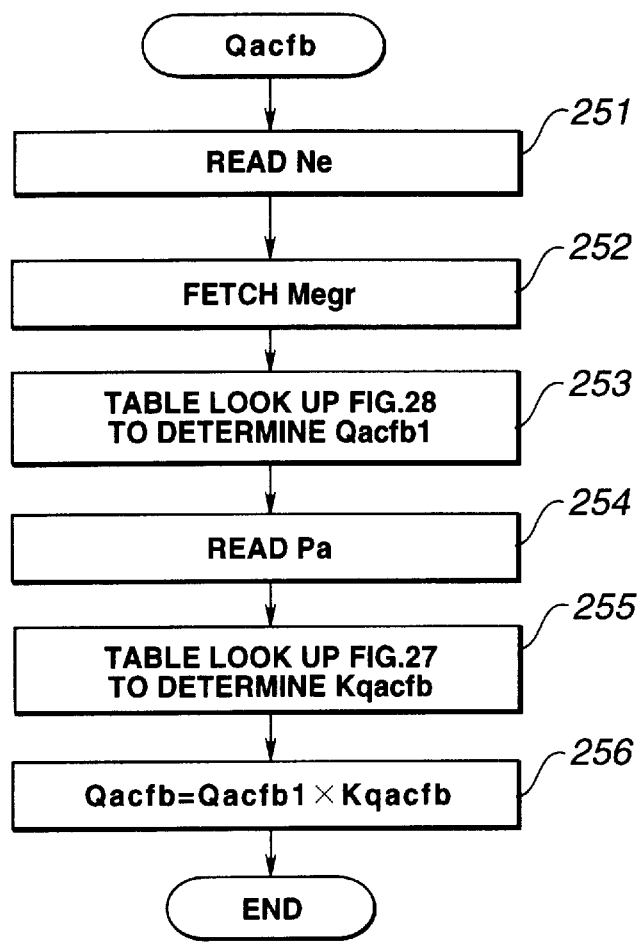
FIG. 25 is a computer flowchart illustrating other manner of determining a base value Qacfb.

In step 221, the control unit 28 inputs a reference base Qacfb that is determined after execution of flowchart of FIG. 23 or FIG. 24 or FIG. 25. In step 222, the control unit 28 performs calculation of equation (11) to determine Qacf.

Execution of flowchart of FIG. 23 is to determine the reference base Qacfb.

In step 231, the control unit 28 performs reading operation of engine RPM Ne. In step 232, the control unit 28 performs a table look-up operation of FIG. 26 using Ne to determine Qacfb.

Flowchart of FIG. 24 shows steps of another manner of determining the reference base Qacfb.

In step 241, the control unit 28 performs reading operation of engine RPM Ne. In step 242, the control unit 28 performs table look-up operation of FIG. 26 using Ne and sets the result as Qacfb1. In step 243, the control unit 28 performs reading operation of barometric pressure Pa. In step 244, the control unit 28 performs table look-up operation of FIG. 27 using Pa to determine altitude compensation coefficient Kqacb. In step 245, the control unit 28 performs calculation of equation (12) to determine Qacfb as altitude compensated.

Flowchart of FIG. 25 shows steps of still another manner of determining the reference base Qacfb.

In step 251, the control unit 28 performs reading operation of engine RPM Ne. In step 252, the control unit 28 inputs desired EGR rate Megr. In step 253, the control unit 28 performs table look-up operation of FIG. 28 using Ne and Megr to determine Qacfb1. In step 254, the control unit 28 performs reading operation of barometric pressure Pa. In step 255, the control unit 28 performs table look-up operation of FIG. 27 using Pa to determine altitude compensation coefficient Kqacb. In step 256, the control unit 28 performs calculation of equation (12) to determine Qacfb as altitude compensated.

Figure 29:
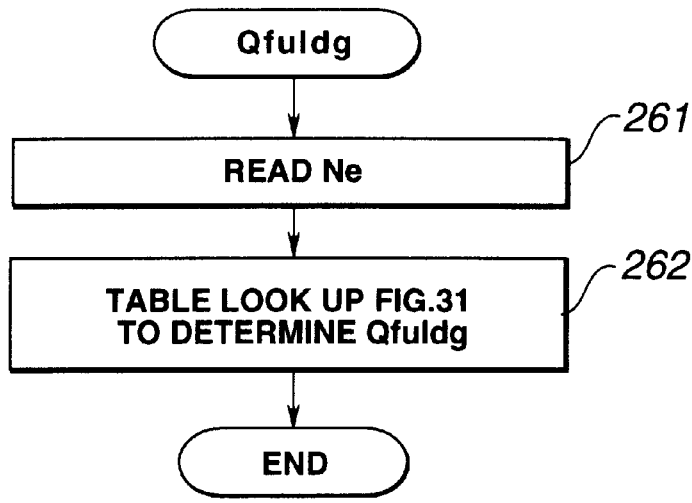
FIG. 29 is a computer flowchart illustrating steps to determine maximum fuel Qfuldg for abnormal operation mode where the actual EGR performance remains outside of the predetermined window around the normal EGR performance.

Execution of flowchart of FIG. 29 is to determine abnormal mode maximum fuel Qfludg.

In step 261, the control unit 28 performs reading operation of engine RPM Ne. In step 262, the control unit 28 performs table look-up operation of FIG. 31 to determine Qfludg. The setting of Qfludg is to suppress fuel injection amount, avoiding increase of exhaust gas temperature, thus making it possible for the operator to drive the vehicle to nearby repair shop or car dealer.

Figure 30:
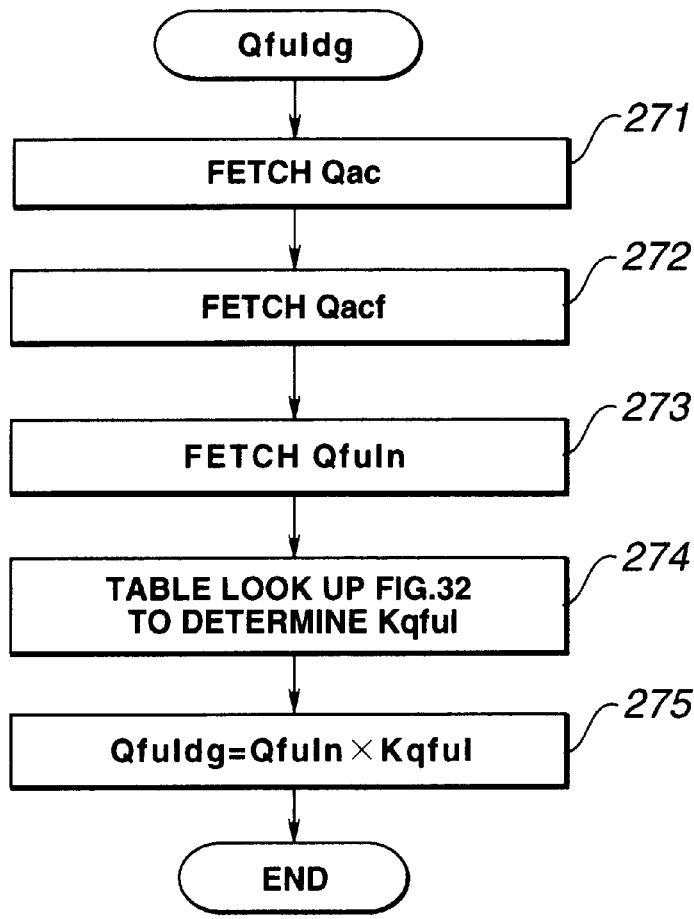
FIG. 30 is a computer flowchart illustrating another manner of determining a maximum fuel Qfuldg for abnormal operation mode.

Flowchart of FIG. 30 shows steps of another manner of determining Qfuldg.

In step 271, the control unit 28 inputs Qac. In step 272, the control unit 28 inputs Qacf. In step 273, the control unit 28 inputs Qfuln that has been determined by calculating the equation (13). In step 274, the control unit 28 performs table look-up operation of FIG. 32 using an error Qac−Qacf to determine coefficient Kqful. In step 275, the control unit 28 performs calculation of equation (14) to determine Qfuldg.

Referring to FIG. 32, when Qac is greater than Qacf, Qfuldg is equal to Qfuln. Thus, when the EGR valve 42 sticks to a position whereby actual EGR rate remains less than the desired EGR rate, normal mode maximum fuel Qfuln is used. When Qac is less than Qacf and thus actual EGR rate is greater than the desired EGR rate, Qfuldg is adjusted in response to the position, which the EGR valve 42 sticks to.

What is claimed is:

1. An internal combustion engine, comprising:

a cylinder including a combustion space;

an intake manifold from which air is drawn into said combustion space during operation of the engine;

an exhaust manifold into which exhaust gas resulting from combustion event in said combustion space is discharged;

an EGR conduit providing a path through which a portion of the exhaust gas passes into said intake manifold;

an EGR valve forming a part of an EGR passage in said EGR conduit, said EGR valve having different valve openings; and a control arrangement monitoring performance of EGR control and limiting the maximum fuel, in amount, to be drawn into said cylinder in response to the result from monitoring performance of EGR control.

2. An internal combustion engine as claimed in claim 1, wherein said control arrangement derives actual performance of EGR control from desired EGR rate and engine RPM.

3. An internal combustion engine as claimed in claim 1, wherein said control arrangement altitude compensates normal performance of EGR control in accordance with barometric pressure.

4. An internal combustion engine as claimed in claim 3, wherein said control arrangement adjusts a correction term of normal performance of EGR control such that the lower the barometric pressure the smaller the correction term and the higher the barometric pressure the greater the correction term.

5. An internal combustion engine as claimed in claim 1, wherein said control arrangement determines whether or not actual performance of EGR control falls in a predetermined window around desired performance of EGR control, and wherein said control arrangement reduces the maximum fuel, in amount, to be drawn into said cylinder when actual performance of EGR control falls outside of said predetermined window around desired performance of EGR control.

6. An internal combustion engine as claimed in claim 1, wherein said control arrangement includes a throttle valve in an air intake path and upstream of said intake manifold, and said control arrangement fully opens said throttle valve when an abnormal EGR control is determined.

7. An internal combustion engine as claimed in claim 6, wherein said control arrangement determines the reduction in the maximum fuel as a function of a deviation between actual performance of EGR control and desired performance of EGR control.

8. An internal combustion engine as claimed in claim 6, wherein said control arrangements further sets a desired EGR quantity toward minimum when the abnormal EGR control is determined.

9. An internal combustion engine as claimed in claim 8, wherein said control arrangements further reduce the maximum fuel to be drawn into said cylinder when the abnormal EGR control is determined.

10. An internal combustion engine as claimed in claim 9, wherein a reduction amount of the maximum fuel will be determined in accordance with barometric pressure.

11. An internal combustion engine as claimed in claim 10, wherein the internal combustion engine is a diesel engine.

\* \* \* \* \*